(12) United States Patent
Kamei et al.

(10) Patent No.: US 8,797,573 B2
(45) Date of Patent: Aug. 5, 2014

(54) IMAGE FORMING APPARATUS, PRINT DATA PROCESSING METHOD THEREOF, AND RECORDING MEDIUM

(75) Inventors: Nobuo Kamei, Osaka (JP); Tomoyuki Okamoto, Suita (JP); Yasuji Takeuchi, Kobe (JP); Tomo Tsuboi, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1047 days.

(21) Appl. No.: 12/491,550

(22) Filed: Jun. 25, 2009

(65) Prior Publication Data

US 2009/0323112 A1 Dec. 31, 2009

(30) Foreign Application Priority Data

Jun. 26, 2008 (JP) ................................. 2008-166885

(51) Int. Cl.
*G06F 3/12* (2006.01)
(52) U.S. Cl.
USPC ........ 358/1.15; 358/1.18; 358/1.14; 358/501; 358/400; 455/456.3; 455/41.2; 709/223; 709/246
(58) Field of Classification Search
None
See application file for complete search history.

(56) References Cited

U.S. PATENT DOCUMENTS

| | | | |
|---|---|---|---|
| 5,335,085 A * | 8/1994 | Nakatsuma | 358/404 |
| 5,822,077 A | 10/1998 | Sasaki et al. | |
| 6,115,132 A * | 9/2000 | Nakatsuma et al. | 358/1.14 |
| 6,882,450 B1 | 4/2005 | Baba | |
| 7,403,312 B2 * | 7/2008 | Soneoka | 358/474 |
| 7,480,707 B2 * | 1/2009 | Morlitz | 709/223 |
| 7,805,539 B2 * | 9/2010 | Hara | 709/246 |
| 8,150,449 B2 * | 4/2012 | Onozawa | 455/550.1 |
| 2005/0113025 A1 | 5/2005 | Akamatsu et al. | |
| 2005/0160068 A1 | 7/2005 | Sakaguchi | |
| 2005/0270567 A1 | 12/2005 | Du et al. | |

FOREIGN PATENT DOCUMENTS

| | | |
|---|---|---|
| JP | 06-189048 | 7/1994 |
| JP | 08-262939 | 10/1996 |
| JP | 10-65862 A | 3/1998 |
| JP | 2000-224364 A | 8/2000 |
| JP | 2003-015828 | 1/2003 |
| JP | 2004-098413 | 4/2004 |
| JP | 2004-159104 | 6/2004 |
| JP | 2005-193411 | 7/2005 |
| JP | 2005-234910 | 9/2005 |
| JP | 2005-254793 | 9/2005 |
| JP | 2006-227760 A | 8/2006 |

(Continued)

OTHER PUBLICATIONS

Notification of Reasons for Refusal issued in the corresponding Japanese Patent Application No. 2008-166885 dated Jun. 1, 2010, and an English Translation thereof.

*Primary Examiner* — Ashish K Thomas
(74) *Attorney, Agent, or Firm* — Buchanan Ingersoll & Rooney PC

(57) ABSTRACT

An image forming apparatus judges whether or not a close-range wireless communication with a portable terminal is enabled during a period until a printer completes printing out print data. Based on a result drawn from the judgment and a print operation status of the image forming apparatus itself, which is indicated until completion of printing out the print data, the image forming apparatus deletes the print data from the memory or keeps the print data recorded in the memory.

14 Claims, 24 Drawing Sheets

(56) References Cited

FOREIGN PATENT DOCUMENTS

| | | |
|---|---|---|
| JP | 2007-157084 A | 6/2007 |
| JP | 2007-272858 | 10/2007 |
| JP | 2008-502055 T | 1/2008 |
| JP | 2008-059020 | 3/2008 |
| JP | 2008-140068 | 6/2008 |

\* cited by examiner

| Portable Terminal ID | Job | Operation Progress | Communication Availability | Time Elapsing from Missing Communication |
|---|---|---|---|---|
| 01-23-45-67-89-AB | Now executing | 2/8 page(s) | Enabled | 0 second(s) |
| CD-EF-12-34-56-78 | Deleted | 5/10 page(s) | Disabled | — |
| 01-23-45-67-AB-CD | Deleted | 0/2 page(s) | Disabled | — |

FIG. 8

| MFP Status | Condition to Change MFP Status | | | MFP Status After Change | Required MFP Operation |
|---|---|---|---|---|---|
| | Communication Availability | Communication Status Change Event | MFP Operation | | |
| Standing-by | — | — | — | Standing-by | — |
| | — | — | Print data receiving start | Waiting for print start | — |
| Waiting for print start | — | — | — | Waiting for print start | — |
| | — | — | Print start | Now printing | — |
| | — | Enabled→Disabled | — | Standing-by | Delete print data |
| | — | Enabled→Disabled | — | Now printing | — |
| | — | Disabled→Enabled | — | | |
| Now printing | — | — | Print completion | Standing-by | Complete printing |
| | Enabled | — | Stabilization start | Now stabilizing-1 | — |
| | Disabled | — | Stabilization start | Now stabilizing-2 | — |
| | Enabled | — | Jam occurrence | Jam-1 | — |
| | Disabled | — | Jam occurrence | Jam-2 | — |
| | Enabled | — | Paper empty occurrence | Paper empty-1 | — |
| | Disabled | — | Paper empty occurrence | Paper empty-2 | — |
| Now stabilizing-1 | — | — | Stabilization completion | Now stabilizing-3 | — |
| | — | Enabled→Disabled | — | Now printing | Resume printing |
| Now stabilizing-2 | — | — | Stabilization completion | Now stabilizing-2 | — |
| | — | Enabled→Disabled | — | Now printing | Resume printing |
| Now stabilizing-3 | — | Disabled→Enabled | — | Now stabilizing-3 | — |
| | — | — | Stabilization completion | Now stabilizing-1 | — |
| Jam-1 | — | — | Jam resolving process check | Waiting | — |
| | — | Enabled→Disabled | — | Jam-1 | — |
| | — | Enabled→Disabled | — | Now printing | Resume printing |
| Jam-2 | — | — | — | Standing-by | Delete print data |
| | — | — | Jam resolving process check | Jam-2 | — |
| | — | Enabled→Disabled | — | Now printing | Resume printing |
| | — | — | Predetermined time lapse | Paper empty-1 | Time Measurement=ON |
| Paper empty-1 | — | — | | | Time Measurement=OFF |
| | Enabled | — | Paper replacement check | Standing-by | Delete print data |
| | Disabled | — | Paper replacement check | Now printing | Resume printing |
| | — | Enabled→Disabled | — | Standing-by | Delete print data |
| | — | Disabled→Enabled | — | Paper empty-2 | — |
| Paper empty-2 | — | — | Paper replacement check | Now printing | Resume printing |
| Waiting | — | — | — | Waiting | — |
| | — | Disabled→Enabled | — | Now printing | Resume printing |

List of Responding Terminals

| Portable Terminal ID |
| --- |
| 01-23-45-67-89-AB |
| 44-44-44-44-44-04 |
| 55-55-55-55-55-05 |

FIG.13

List of Portable Terminal Information

| Portable Terminal ID | Job | Operation Progress | Communication Availability | Time Elapsing from Missing Communication |
|---|---|---|---|---|
| 01-23-45-67-89-AB | Now executing | 2/8page(s) | Enabled | 30 second(s) |
| CD-EF-12-34-56-78 | Deleted | 5/10page(s) | Disabled | — |
| 01-23-45-67-AB-CD | Deleted | 0/2page(s) | Disabled | — |

List of Responding Terminals

| Portable Terminal ID |
|---|
| 01-23-45-67-89-AB |
| CD-EF-12-34-56-78 |
| 55-55-55-55-55-05 |

FIG.17

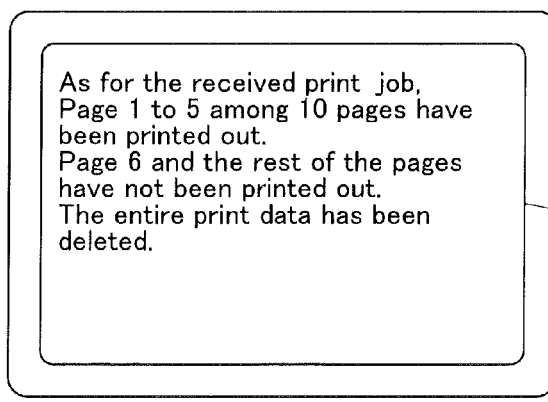

As for the received print job,
Page 1 to 5 among 10 pages have been printed out.
Page 6 and the rest of the pages have not been printed out.
The entire print data has been deleted.

FIG.18

List of Portable Terminal Information

| Portable Terminal ID | Job | Operation Progress | Communication Availability | Time Elapsing from Missing Communication |
|---|---|---|---|---|
| 01-23-45-67-89-AB | Now executing | 2/8page(s) | Enabled | 30 second(s) |
| 01-23-45-67-AB-CD | Deleted | 0/2page(s) | Disabled | — |

IMAGE FORMING APPARATUS, PRINT DATA PROCESSING METHOD THEREOF, AND RECORDING MEDIUM

This application claims priority under 35 U.S.C. §119 to Japanese Patent Application No. 2008-166885 filed on Jun. 26, 2008, the entire disclosure of which is incorporated herein by reference in its entirety.

BACKGROUND OF THE INVENTION

1. Field of the Invention

The present invention relates to an image forming apparatus that is capable of printing out print data transmitted from a user's using portable terminal by a close-range wireless communication system or print data obtained from the portable terminal according to storage information of the print data; a print data processing method of the image forming apparatus; and a computer readable recording medium having a print data processing program recorded therein to make a computer of the image forming apparatus execute processing.

2. Description of the Related Art

The following description sets forth the inventor's knowledge of related art and problems therein and should not be construed as an admission of knowledge in the prior art.

As disclosed in Japanese Unexamined Laid-open Patent Publication No. 2007-157084, an image forming apparatus such as a MFP (Multi Functional Peripheral) that is a multi-functional digital machine has been known to receive print data that is transmitted from a portable terminal such as a cell-phone by a close-range wireless communication system such as the Bluetooth, and print out the print data.

When using such an image forming apparatus, there is a consciousness that the security of print data recorded in the image forming apparatus should be ensured, which has grown for recent years as in the case of other image forming apparatuses. In order to ensure the security, it is desirable to delete the print data recorded therein if a trouble or etc. occurs to the image forming apparatus.

Furthermore, as suggested in Japanese Unexamined Laid-open Patent Publication No. 2006-227760, an image forming apparatus has been known to transmit an inquiry whether or not to retry printing, to a host computer who instructed a print job via a network, instead of immediately deleting data recorded therein, if an error occurs while printing a confidential document, and then retry printing if a retry instruction is issued, meanwhile cancel the job and delete the data if no retry instruction is issued.

Also, an image forming apparatus has been known to display a notice on a display panel of the image forming apparatus itself and/or on a display device of a computer used by a user who instructed a print job, if a print operation happens to be interrupted due to occurrence of a trouble.

However, if a trouble or etc. occurs and print data recorded therein is immediately deleted without any conditions, the user has to retransmit the print data to the image forming apparatus from his/her using portable terminal even though the trouble is easy enough to restore the operation to normal status soon, which causes poor usability.

Meanwhile, if a trouble or etc. occurs while a close-range wireless communication is disabled due to the user's being away from the image forming apparatus, a notice cannot be displayed in the way described in Japanese Unexamined Laid-open Patent Publication No. 2006-227760, which causes a problem that the print data is left recorded therein and the security cannot be ensured. To resolve this problem, the image forming apparatus can be configured to register notification addresses of portable terminals to transmit a notice for users. However, there is another problem that the users who have not registered their notification addresses are not allowed to use this service, which still causes poor usability.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image forming apparatus capable of printing out print data received from a portable terminal by a close-range wireless communication system, which improves user-friendliness by precisely judging whether or not to delete the print data for ensuring the security of the print data, if a trouble or etc. occurs.

It is another object of the present invention to provide a print data processing method that is implemented by the image forming apparatus.

It is yet another object of the present invention to provide a computer readable recording medium having a print data processing program recorded therein to make a computer of the image forming apparatus execute processing by the print data processing method.

According to a first aspect of the present invention, an image forming apparatus includes:

a close-range wireless communicator that is capable of performing a close-range wireless communication with a user's using portable terminal;

a memory that records in itself, print data that is transmitted by the portable terminal and received by the close-range wireless communicator or print data that is obtained from a storage location according to storage information of the print data, which is transmitted by the portable terminal;

a printer that prints out the print data recorded therein;

a communication status judger that judges whether or not a communication with the portable terminal is enabled by the close-range wireless communicator, until the printer completes printing out the print data; and a controller that deletes the print data from the memory or keeps the print data recorded in the memory, based on a judgment result drawn by the communication status judger and a print operation status of the image forming apparatus itself, which is indicated until the print data is completely printed out.

According to a second aspect of the present invention, a print data processing method of an image forming apparatus includes:

recording in a memory, print data that is transmitted by a user's using portable terminal and received by a close-range wireless communicator, or print data that is obtained from a storage location according to storage information of the print data, which is transmitted by the portable terminal;

printing out the print data recorded therein, by a printer;
judging whether or not a communication with the portable terminal is enabled by the close-range wireless communicator, until the print data is completely printed out in the prior step; and
deleting the print data from the memory or keeping the print data recorded in the memory, based on a judgment result drawn in the prior step and a print operation status of the image forming apparatus, which is indicated until the print data is completely printed out.

According to a third aspect of the present invention, a computer readable recording medium has a print data processing program recorded therein to make a computer of an image forming apparatus execute:
recording in a memory, print data that is transmitted by a user's using portable terminal and received by a close-range wireless communicator, or print data that is obtained from a storage location according to storage information of the print data, which is transmitted by the portable terminal;
printing out the print data recorded therein, by a printer;
judging whether or not a communication with the portable terminal is enabled by the close-range wireless communicator, until the print data is completely printed out in the prior step; and
deleting the print data from the memory or keeping the print data recorded in the memory, based on a judgment result drawn in the prior step and a print operation status of the image forming apparatus, which is indicated until the print data is completely printed out.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 8 is a view showing a specific example of an operation table to perform a control operation in relation to whether or not to delete the print data;

FIG. 13 is a view showing a list of responding terminals;

FIG. 16 is a view showing an example of a list of information of portable terminals;

FIG. 17 is a view showing an example of a list of the portable terminals that respond;

FIG. 18 is a view showing a message to allow to know deletion of print data, which is displayed on a display of a portable terminal;

FIG. 19 is a view showing a list of information of portable terminals, which is displayed after a record related to the portable terminal having received the notice is deleted;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
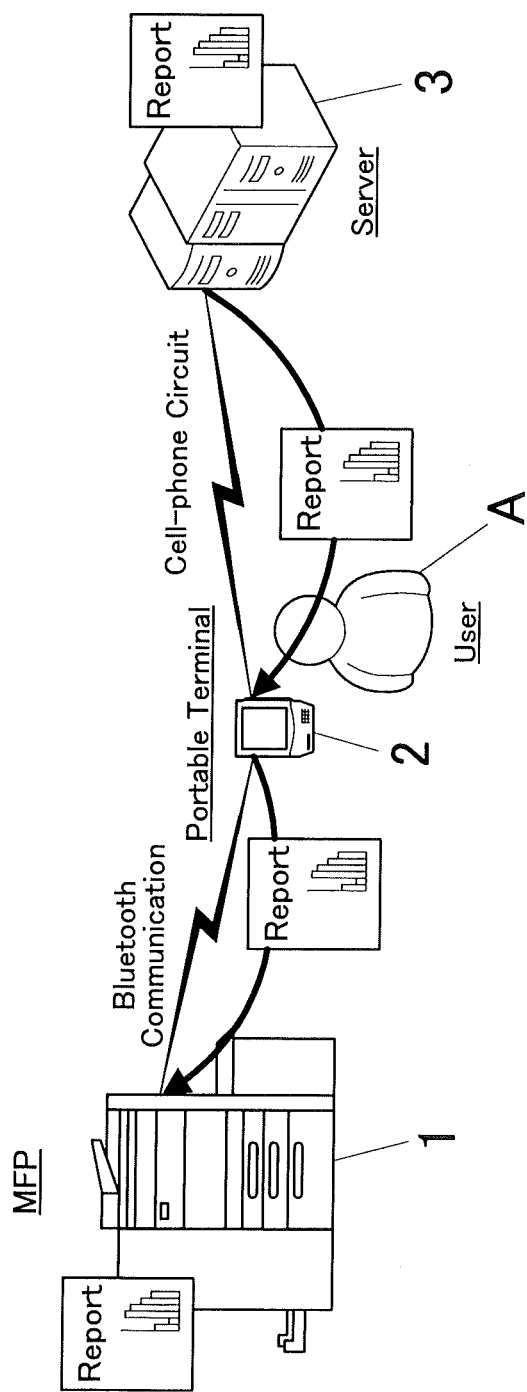
FIG. 1 is a view to explain an example of a method, in which a user transmits print data from his/her using portable terminal to an image forming apparatus according to one embodiment of the present invention, to have it printed out.

FIG. 1 is a view to explain an example of a method, in which a user transmits print data from his/her using portable terminal to an image forming apparatus according to one embodiment of the present invention, to have it printed out.

As shown in FIG. 1, User A accesses a server 3 from his/her using portable terminal 2 such as a cell-phone, via a long-range communicator such as a cell-phone circuit, and downloads print data from the server 3. And then, he/she transmits the downloaded print data to an image forming apparatus 1 together with a print instruction, by a close-range wireless communication system. Receiving the print data from the portable terminal 2, the image forming apparatus 1 prints out the print data according to the print instruction.

The image forming apparatus 1 may receive print data that is directly transmitted from the portable terminal 2, and also may obtain print data by accessing a storage location according to storage information of the print data, which is transmitted from the portable terminal 2. For example, print data is stored in a storage location existing in a memory (a hard disk drive or etc.) of the server 3, a user's using personal computer or etc., and the storage information indicates a path or a URL that specifies an area of the memory storing the print data.

Furthermore, in this embodiment, a close-range wireless communication is performed by using the Bluetooth, for example. However, the close-range wireless communication system is not limited to the Bluetooth and may be another one.

Figure 2:
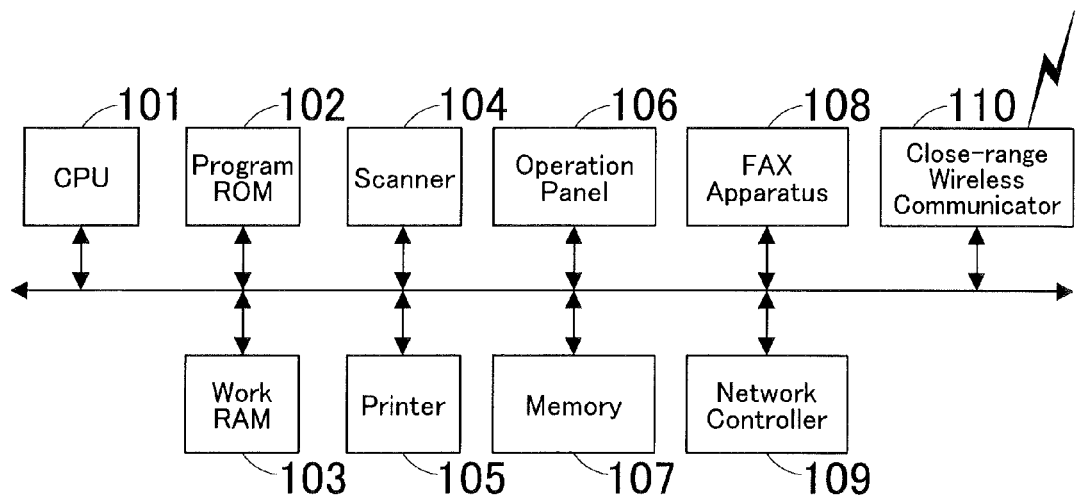
FIG. 2 is a block diagram showing a configuration of an image forming apparatus shown in FIG. 1.

FIG. 2 is a block diagram showing a configuration of the image forming apparatus shown in FIG. 1. In this embodiment, as the image forming apparatus 1, a MFP that is a multifunctional digital machine collectively having many functions such as the copy function, the print function, the facsimile function and the function to transmit data to other apparatuses, is employed, as previously mentioned. However, the image forming apparatus 1 is not limited to a MFP and may be a copier, a printer, a facsimile or etc., for example.

As shown in FIG. 2, the image forming apparatus 1 includes a CPU 101, a program ROM 102, a work RAM 103, a scanner 104, a printer 105, an operation panel 106, a memory 107, a facsimile (FAX) apparatus 108, a network controller 109, a close-range wireless communicator 110, and etc.

The CPU 101 centrally controls the entire image forming apparatus 1. Furthermore, in this embodiment, it controls a judgment whether or not to delete print data that is received from the portable terminal 2 and recorded in the memory 107, based on an operation status of the printer 105 and the availability of a wireless communication with the portable terminal 2.

The program ROM 102 is a memory that stores in itself an operation program for the CPU 101 and other data. The work RAM 103 is a memory that provides an operation area for the CPU 101 to execute processing according to the operation program. In this embodiment, information about the portable terminal 2 that is the transmitter of the print data is stored in the work RAM 103.

The scanner 104 is a reader that reads an image of a document placed on a document table (not shown in Figure) and outputs image data.

The printer 105 prints out image data read out from a document by the scanner 104, print data received from the portable terminal 2, print data received from a user's using computer, and other data, according to a specified mode.

Figure 3:
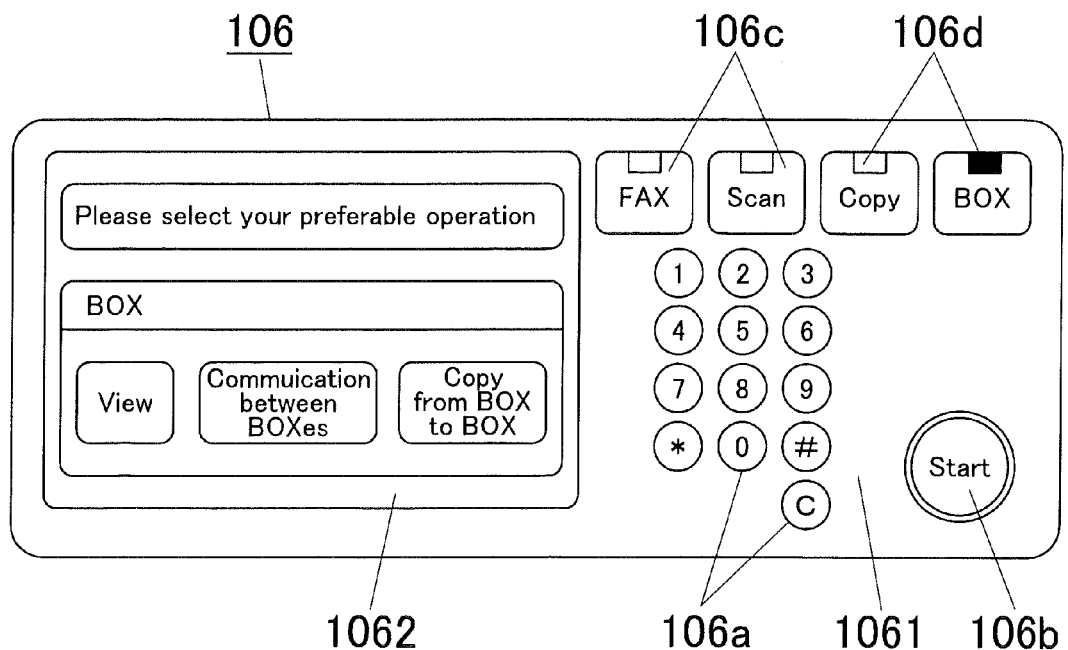
FIG. 3 is a plain view of an operation panel.

The operation panel 106 is used for various entries and display. As shown in FIG. 3, this operation panel 106 includes a key portion 1061 having numeric keys 106a, a start key 106b, mode selection keys 106c and other keys, and a display 1062 that is a liquid crystal display with the touch-panel functionality. Indicators 106d shown in FIG. 3 are LED indicators that indicates which mode selection key 106c is selected.

The memory 107 is constructed of a nonvolatile recording medium such as a hard disk drive (HDD). This memory 107 records in itself image data and print data as previously mentioned.

The FAX apparatus 108 performs data communications by FAX via a telephone circuit.

The network controller 109 controls communications with other image forming apparatus on the network and communications with other external apparatuses such as a user's using computer and etc.

The close-range wireless communicator 110 performs a wireless communication with the portable terminal 2 existing in the vicinity. In this embodiment, the Bluetooth is employed as a close-range wireless communication system, as previously mentioned.

Figures 4, 5:
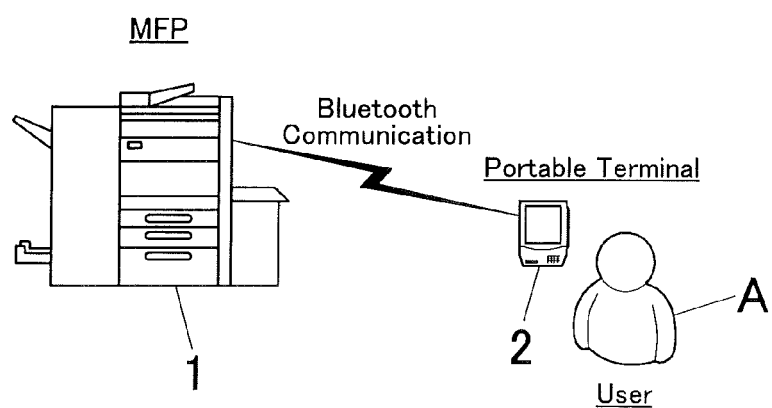
FIG. 4 is a view showing a list of information of portable terminals.
FIG. 5 is a view to explain a basic control concept implemented by the image forming apparatus, in relation to deletion of the print data received from the portable terminal 2.

FIG. 4 is a view showing a list of records that are information of the portable terminals 2 (hereinafter will be referred to as "portable terminal information", which is recorded in the work RAM 103.

Receiving a print job from the portable terminal 2, the image forming apparatus 1 stores unique information of the sender portable terminal, as a portable terminal ID. As well as a portable terminal ID, the portable terminal information includes data titled as "job", "operation progress", "communication availability" and "time elapsing from missing communication".

In the "job" column, job statuses are shown. The job status is set as "now executing" during a period from start of receiving print data until the job is normally completed, and it is set as "deleted" if the job is not normally completed and the print data is deleted. Meanwhile, if the job is discarded by user operation, output of all pages of the print data is normally completed.

In the "operation progress" column, job execution progresses are shown. More concretely, a page number of the page lastly received and a page number of the page lastly printed, are shown.

In the "communication availability" column, the availabilities of communications with the portable terminal 2 are described as "enabled" or "disabled". The availability of a communication with the portable terminal 2 is checked on a regular basis, and the information is updated according to a checking result.

In the "time elapsing from missing communication" column, durations of missing communications with the portable terminal 2 are shown.

As shown in this example of FIG. 4, a print job received from the portable terminal 2 with the ID "01-23-45-67-89-AB" is now under execution. As for a print job received from the portable terminal 2 with the ID "CD-EF-12-34-56-78", 10 pages of data have been received and the print data is deleted when printing is completed until Page 5. Meanwhile, as for a print job received from the portable terminal 2 with the ID "01-23-45-67-AB-CD", 2 pages of data have been received and the print data is deleted without printing any of the pages completely.

Each of the records included in the list of portable terminal information, is deleted when output of all pages of the print data is completed, or when the operation progress is completely transmitted to the portable terminal 2.

Figure 6:
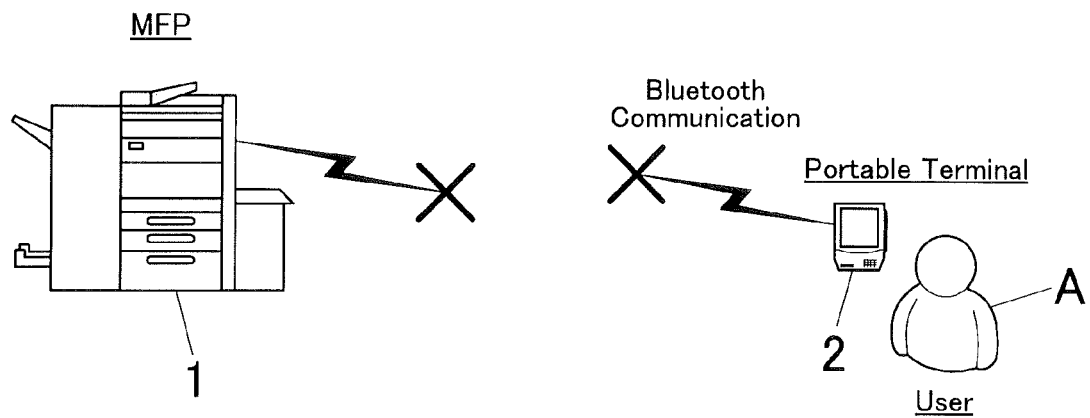
FIG. 6 is a view to explain another basic control concept implemented by the image forming apparatus.
Figure 7:
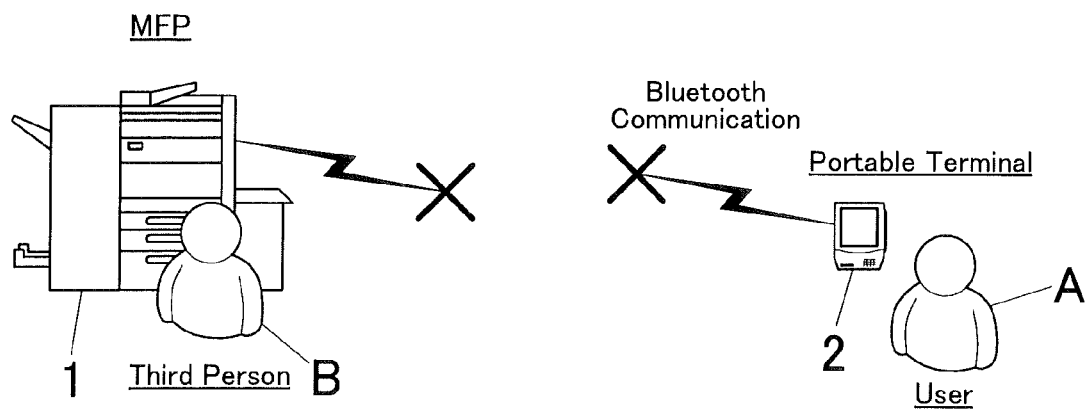
FIG. 7 is a view to explain yet another basic control concept implemented by the image forming apparatus.

FIGS. 5 through 7 are views to explain basic control concepts implemented by the image forming apparatus, in relation to deletion of the print data received from the portable terminal 2.

As shown in FIG. 5, if the image forming apparatus 1 detects a Bluetooth connection with the portable terminal 2 that transmitted a print job, in other words, if a close-range wireless communication is enabled by using the Bluetooth, an owner of the portable terminal 2, that is the user who issued a print instruction, is judged as being in the vicinity of the image forming apparatus 1.

As shown in FIG. 6, if a Bluetooth connection with the portable terminal 2 that transmitted a print job is not detected, in other words, if a close-range wireless communication is disabled by using the Bluetooth, the user who issued a print instruction is judged as being away from the image forming apparatus 1.

As shown in FIG. 7, if someone operates the image forming apparatus 1 when a Bluetooth connection with the portable terminal 2 that transmitted a print job is not detected, a third person, not the user who instructed a print job, is judged as the operator.

Based on such a judgment result that is communication availability, and a print operation status of the image forming apparatus 1, which continues until completion of printing out the print data, a control operation is performed in relation to whether or not to delete the print data.

FIG. 8 shows a specific example of an operation table to perform such a control operation in relation to whether or not to delete the print data.

As shown in this table, the statuses (print operation statuses) of the image forming apparatus 1 (an image forming apparatus also will be referred to as "MFP", in FIG. 8 and the following description) are set as "standing-by", "waiting for print start", "now printing", "now stabilizing—1", "now stabilizing—2", "now stabilizing—3", "jam—1", "jam—2", "jam—3", "paper empty—1", "paper empty—2" and "waiting".

"Now stabilizing" means that a stabilization process is on-going, and in a stabilization process, the image forming apparatus 1 examines what is happening in itself by using a sensor and switches the charged voltage of a photoreceptor and the laser intensity inside of the image forming apparatus 1, in order to obtain images outputted with stable intensity and tone reproduction, not depending on environmental conditions or machine performance. Meanwhile, "jam" refers to a status in which paper is stuck inside, and "paper empty" refers to a status in which paper to carry the print data transferred thereto runs out.

Each of the statuses above has data in the columns "condition to change MFP status", "MFP status after change" and "required MFP operation". Further, there are more columns under the "condition to change MFP status" column, which are "communication availability", "communication status change event" and "MFP operation".

When a communication status change event or a MFP operation event is issued, according to the table of FIG. 8, the status of the MFP is changed to another one and an operation specified in the "required MFP operation" column is performed. The data in the "communication availability" column of a record with "now executing" status according to the "job" column, is extracted from the list of portable terminal information, shown in FIG. 4, and inserted in the "communication availability" column of the "condition to change MFP status", shown in the table of FIG. 8.

The operation table of FIG. 8 will be further explained later.

Figure 9:
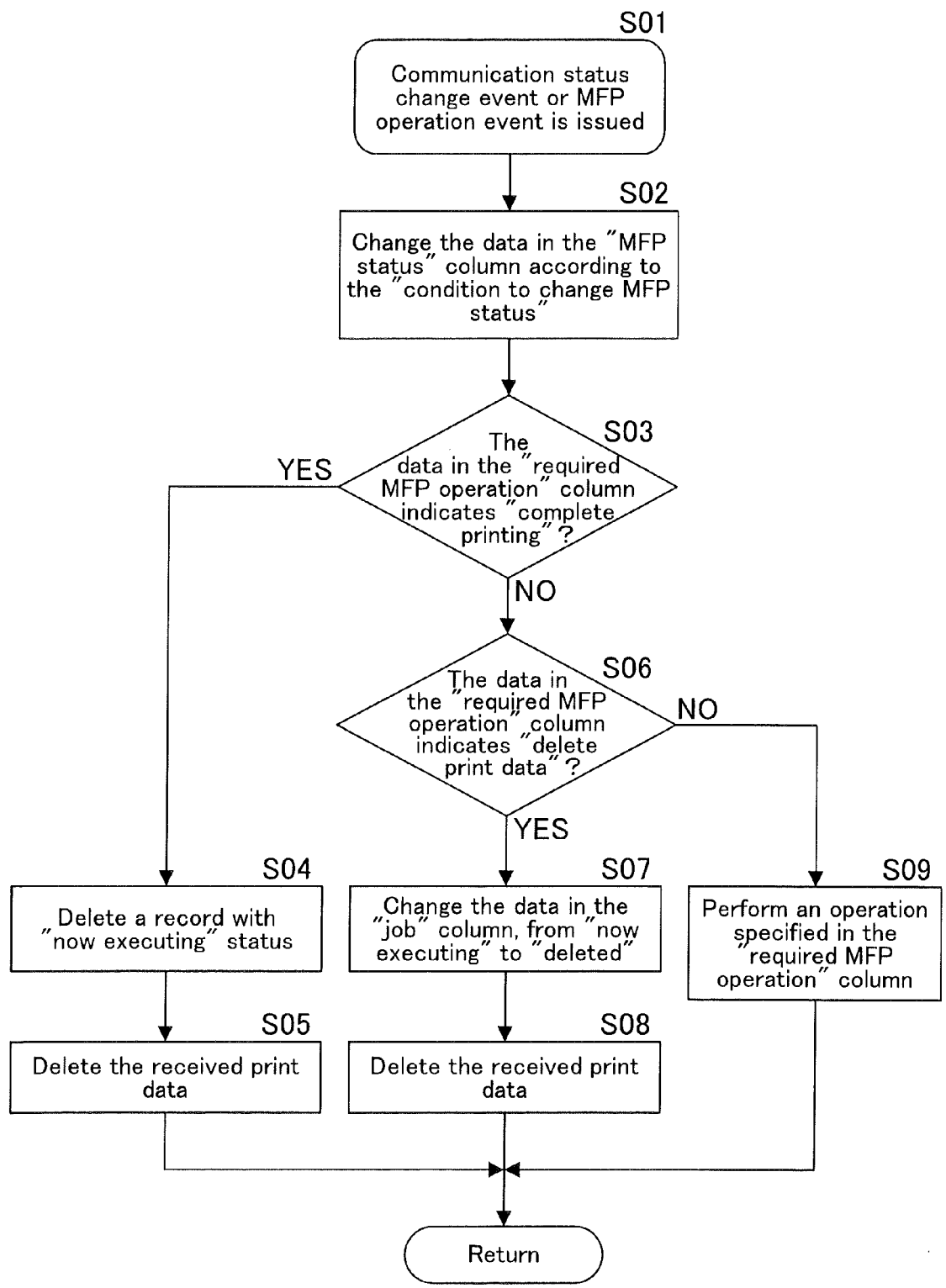
FIG. 9 is a flowchart representing a procedure executed in the image forming apparatus when a communication status change event or a MFP operation event is issued.

FIG. 9 is a flowchart representing a procedure executed in the image forming apparatus 1, when a communication status change event or a MFP operation event is issued. The procedure represented by this flowchart and the procedures in FIG. 10 and in the following Figures are executed by the CPU 101 of the image forming apparatus 1 according to an operation program recorded in a recording medium such as the program ROM 102.

In Step S01, a communication status change event or a MFP operation event is issued. And in Step S02, the data in the "MFP status" column is changed according to the "condition to change MFP status" of FIG. 8.

In Step S03, it is judged whether or not the data in the "MFP operation" column indicates "complete printing". If it indicates "complete printing" (YES in Step S03), the routine proceeds to Step S04, in which a record with "now executing" status, is deleted from the list of portable terminal information of FIG. 4. Subsequently, the print data received and recorded in the memory 107 is deleted in Step S05.

In Step S03, if the data in the "required MFP operation" column does not indicate "complete printing" (NO in Step S03), then it is judged in Step S06, whether or not the data in the "required MFP operation" column indicates "delete print data". If it indicates "delete print data" (YES in Step S06), the data in the "job" column of the record is changed from "now executing" to "deleted" in Step S07. After that, the print data is deleted in Step S08.

In Step S06, if it does not indicate "delete print data" (NO in Step S06), the routine proceeds to Step S09, in which an operation specified in the "required MFP operation" column is performed.

Figure 10:
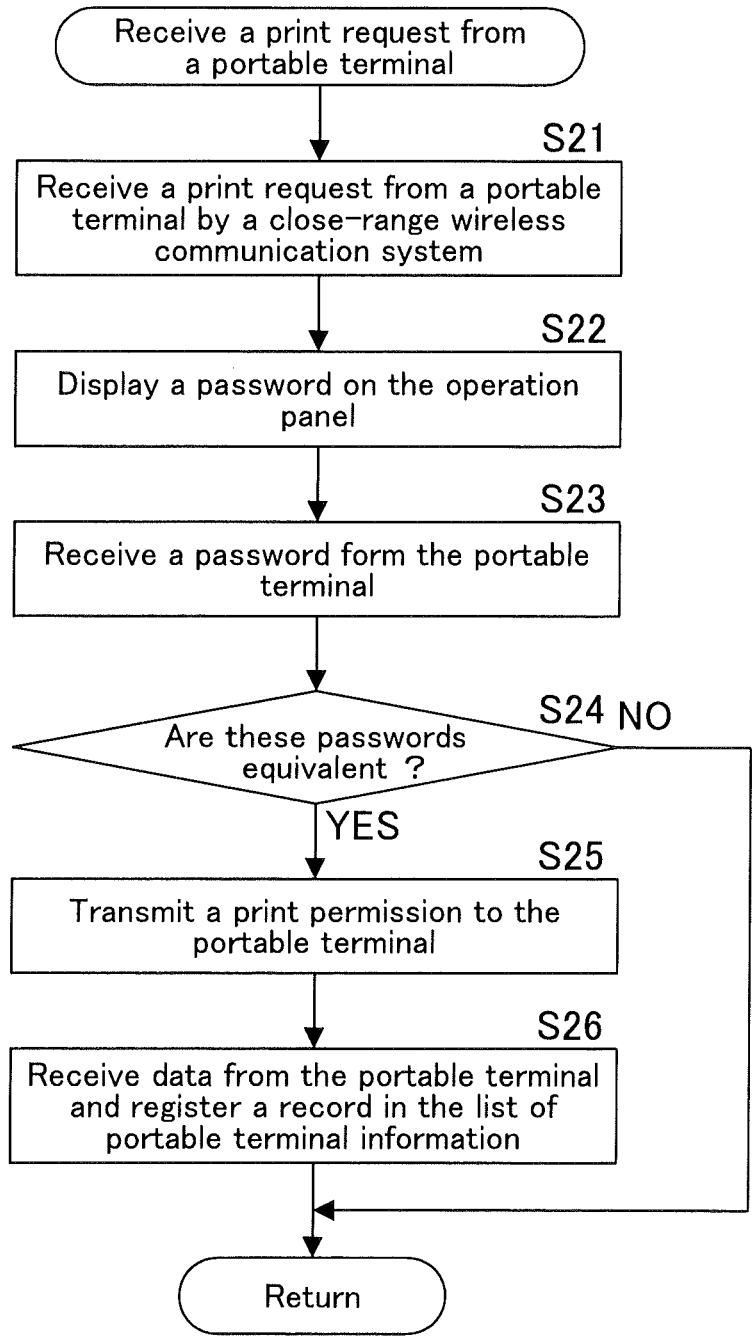
FIG. 10 is a flowchart representing a procedure executed when a print instruction is received from a portable terminal.

FIG. 10 is a flowchart representing a procedure executed when a print request is received from the portable terminal 2.

Figure 11:
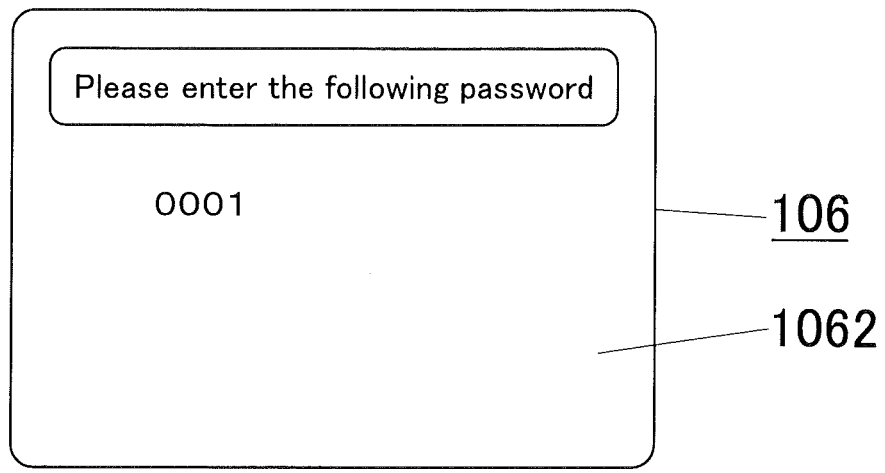
FIG. 11 is a plain view of a display of an operation panel, in which a password is displayed.

A user using the portable terminal 2 performs in the vicinity of the image forming apparatus 1, an operation to transmit a print request by using a close-range wireless communication system. This print request is received in Step S21, and then a password such as a PIN code shown in FIG. 11 is displayed on the operation panel 106, in Step S22. Viewing this password, the user using the portable terminal 2 enters and transmits the password on the portable terminal 2. And this is received by the image forming apparatus 1 in Step S23. Then, it is judged in Step S24, whether or not the displayed password and the received password are equivalent.

If the passwords are not equivalent (NO in Step S24), the routine immediately returns. If the passwords are equivalent (YES in Step S24), a print permission is transmitted to the portable terminal 2 in Step S25. No sooner than print data is transmitted from the portable terminal 2, the print data is received and recorded in the memory 107, then a record is registered in the list of portable terminal information, in Step S26.

Figure 12:
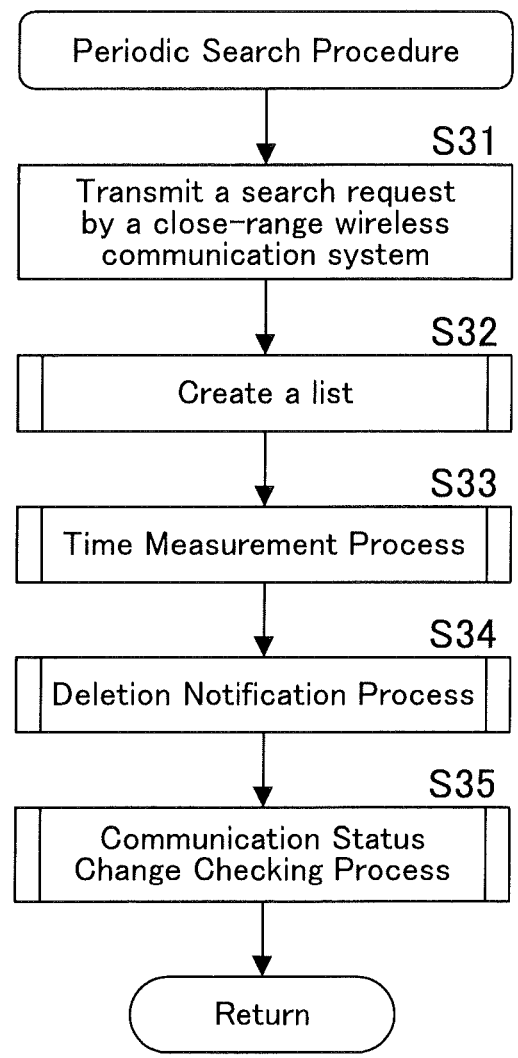
FIG. 12 is a flowchart representing a periodic search procedure executed in the image forming apparatus.

FIG. 12 is a flowchart representing a periodic search procedure executed in the image forming apparatus 1. The image forming apparatus 1 receives from the portable terminal 2, print data requested to be printed out, and also transmits a search request for the portable terminal 2, periodically (for example, every other second) by using a close-range wireless communication system; collects information of portable terminals 2 that are available to communicate; and creates a list of portable terminals 2 that responded (a list of responding terminals).

In Step S31, a search request for the portable terminals 2 is transmitted by using a close-range wireless communication system. After that, a list of responding terminals is created in Step S32. This list is created at every periodic search operation.

FIG. 13 shows a list of responding terminals, created in the way above. There described in the list, the IDs of the portable terminals 2 that responded. Accordingly, the portable terminals 2 listed here are judged as the ones that are available to communicate by using a close-range wireless communication system, and other portable terminals are judged as the ones that are not available to communicate by using a close-range wireless communication system.

In Step S33, a time measurement process for measuring a duration of missing communication by using the created list of responding terminals and the list of portable terminal information shown in FIG. 4, is performed. And in Step S34, a deletion notification process for transmitting to the portable terminal 2, a notice of deletion of print data, is performed. And then in Step S35, a communication status change checking process for issuing a communication status change event when the communication status is changed from "enabled" to "disabled", or from "disabled" to "enabled".

Figure 14:
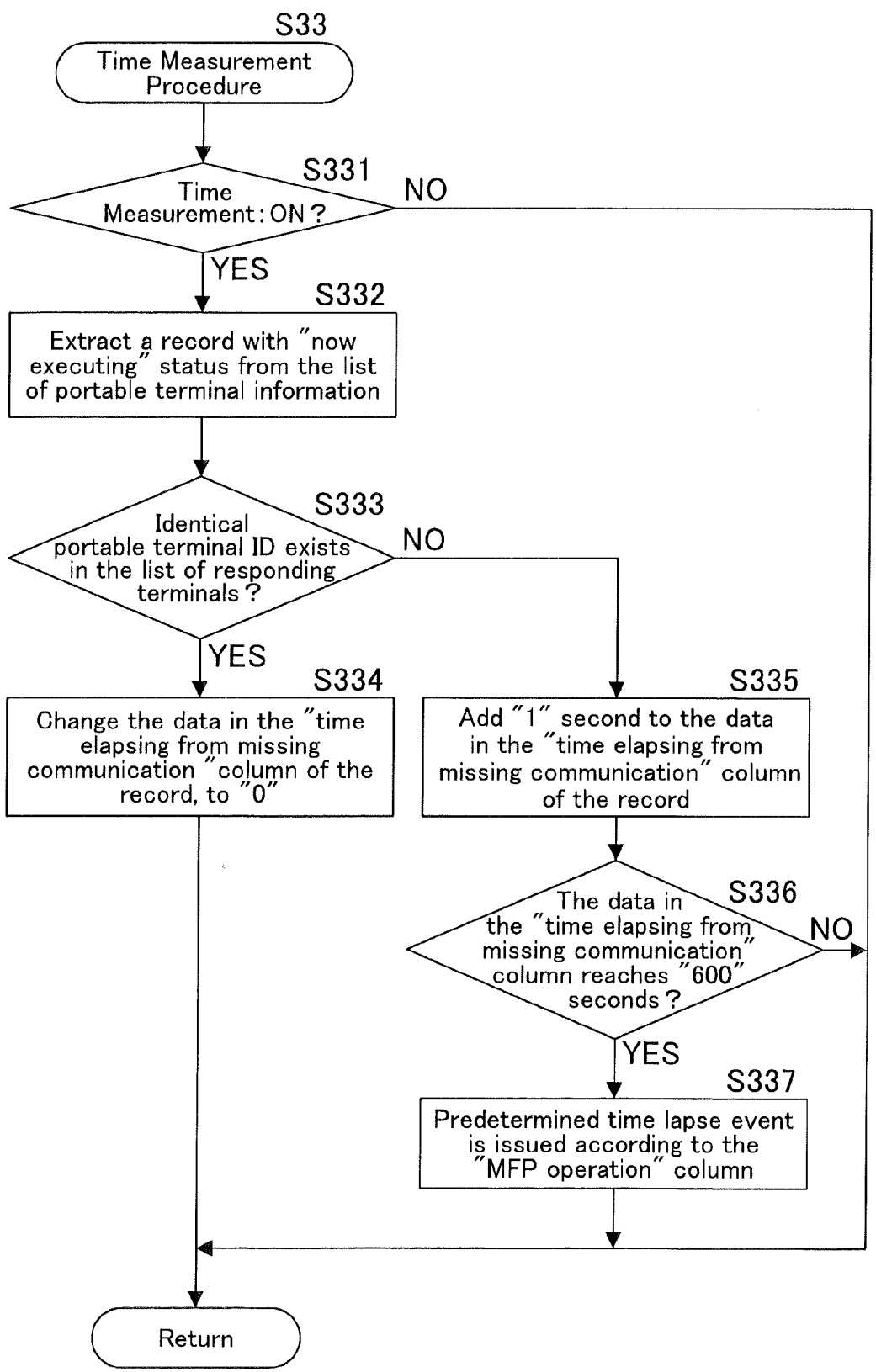
FIG. 14 is a flowchart representing a time measurement procedure that corresponds to Step S33 of the flowchart shown in FIG. 12.

FIG. 14 is a flowchart representing a time measurement procedure that corresponds to Step S33 of the flowchart shown in FIG. 12.

In Step S331, it is judged whether or not the time measurement flag indicates "ON". If it does not indicate "ON" (NO in Step S331), the routine immediately returns. If the time measurement flag indicates "ON" (YES in Step S331), a record with "now executing" status is extracted from the list of portable terminal information, in Step S332. Then it is judged in Step S333, whether or not there exists in the list of responding terminals, a portable terminal ID that is identical with the one included in the record. If there exists an identical portable terminal ID (YES in Step S333), the data in the "time elapsing from missing communication" column of the record is changed to "0" in Step S334. If there does not exist an identical ID (NO in Step S333), "1" second is added to the time currently set in the "time elapsing from missing communication" column of the record, in Step S335.

And then, it is judged in Step S336, whether or not the "time elapsing from missing communication" of the record reaches a predetermined time (600 seconds in this embodiment). If it does not reach yet (NO in Step S336), the routine immediately returns. If it reaches (YES in Step S336), a predetermined time lapse event is issued according to the "MFP operation" column of the table shown in FIG. 8, in Step S337.

Figure 15:
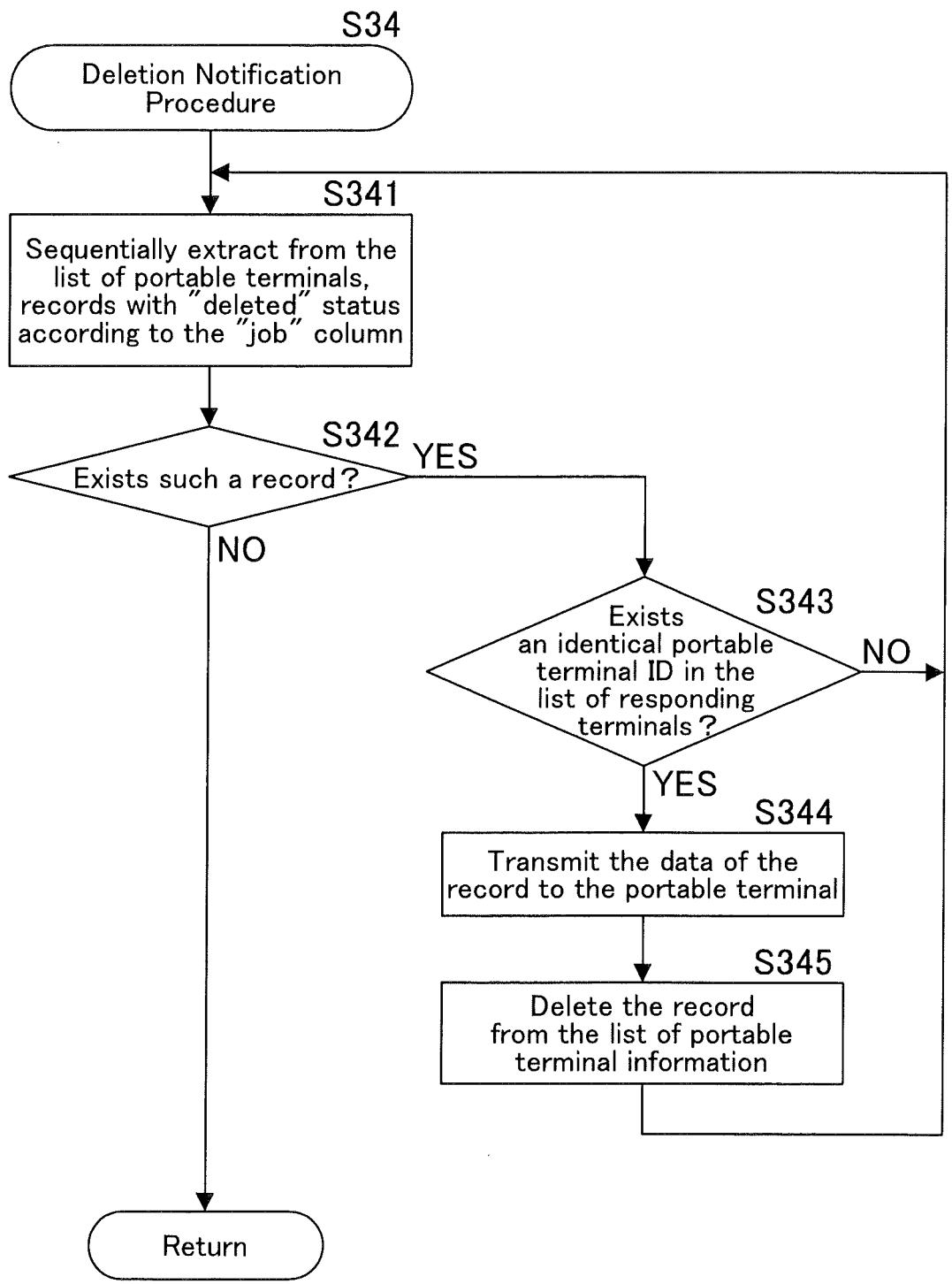
FIG. 15 is a flowchart representing a deletion notification procedure that corresponds to Step S34 of the flowchart shown in FIG. 12.

FIG. 15 is a flowchart representing a deletion notification procedure that corresponds to Step S34 of the flowchart shown FIG. 12.

In Step S341, records of the portable terminals that are in the "deleted" status according to the "job" column, are extracted from the list of portable terminal information, sequentially. And it is judged in Step S342, whether or not there exists a record with "deleted" status according to the "job" column. If there exists (YES in Step S342), and it is judged in Step S343, by comparing a portable terminal ID included in the record to those included in the list of responding terminals, whether or not there exists in the list of responding terminals, a portable terminal ID that is identical with the one included in the record. If there does not exist an identical ID (NO in Step S343), the routine goes back to Step S341.

If there exists an identical ID (YES in Step S343), the data of the record is transmitted to the portable terminal having this identical ID in Step S344, so that the user could know deletion of print data. On the side of the portable terminal 2, the received operation status is displayed on an operation panel of the portable terminal 2, and thus the user is allowed to know that execution of the print job is not normally completed.

Subsequently, in Step S345, the record related to the portable terminal having received the notice is deleted from the list of portable terminal information. After that, the routine goes back to Step S341 and repeats Steps S341 through S345.

In this way above, a notification is sequentially transmitted to the portable terminals that are in the "deleted" status according to the "job" column.

If there does not exist in the list of portable terminal information, any records of the portable terminals that are in the "deleted" status according to the "job" column (NO in Step S342), the routine returns.

For example, comparing the list of portable terminal information shown in FIG. 16 and the list of responding terminals shown in FIG. 17, there exist in the list of portable terminal information, two IDs of the portable terminals that are in the "deleted" status according to the "job" column. As for the ID "CD-ED-12-34-56-78", there exists an identical ID in the list of responding terminals, and thus a notice of deletion of print data is transmitted to the portable terminal having this ID. More concretely, as shown in FIG. 18 according to the record, messages are displayed on the display 21 of the portable terminal 2 to allow to know that Page 1 to 5 among 10 pages of the print job have been printed out; Page 6 and the rest of the pages have not been printed out; and the entire print data has been deleted.

FIG. 19 shows a list of portable terminal information, which is displayed after deletion of the record related to the portable terminal that received a notice. In this example, the record related to the portable terminal having the ID "CD-EF-12-34-56-78" is deleted.

Figure 20:
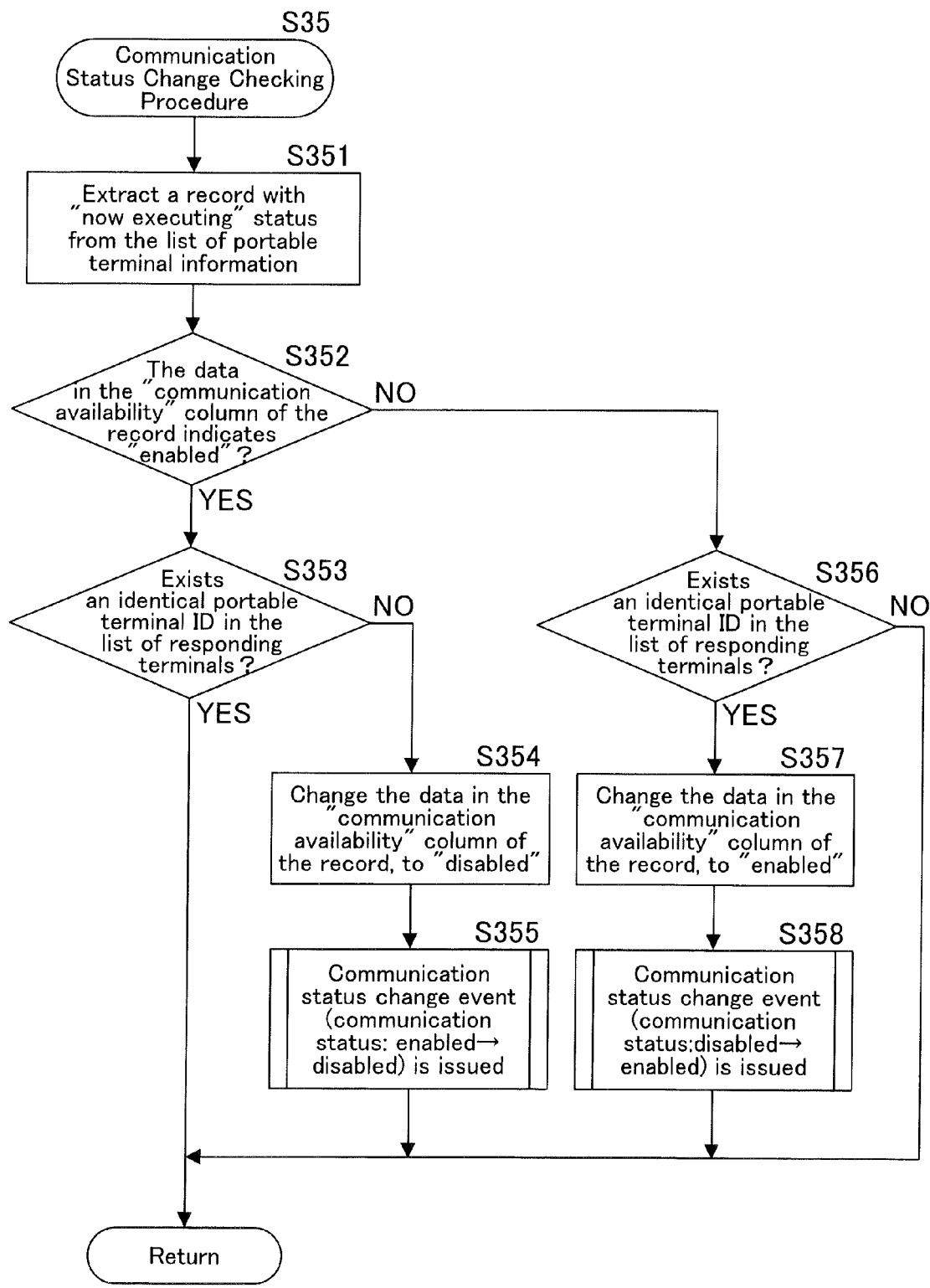
FIG. 20 is a flowchart representing a communication status change checking procedure that corresponds to Step S35 of the flowchart shown in FIG. 12.

FIG. 20 is a flowchart representing a communication status change checking procedure that corresponds to Step S35 of the flowchart shown in FIG. 12.

In Step S351, a record with "now executing" status according to the "job" column is extracted from the list of portable terminal information. After that, it is judged in Step S352, whether or not the data in the "communication availability" column of the extracted record indicates "enabled".

If it indicates "enabled" (YES in Step S352), then it is judged in Step S353, whether or not there exists in the list of responding terminals, an identical portable terminal ID. If there exists an identical ID (YES in Step S353), the routine returns.

If there does not exist an identical ID (NO in Step S353), the data in the "communication availability" column of the record is changed to "disabled" in Step S354. After that, a communication status change event (communication status: "enabled to disabled") is issued according to the table of FIG. 8, in Step S355.

Meanwhile, in Step S352, if the data in the "communication availability" column of the record does not indicate "enabled" (NO in Step S352), then it is judged in Step S356, whether or not there exists in the list of responding terminals, an identical portable terminal ID. If there does not exist an identical ID (NO in Step S356), the routine returns.

If there exists an identical ID (YES in Step S356), the data in the "communication availability" column of the record is changed to "enabled" in Step S357. After that, a communication status change event (communication status: "disabled to enabled") is issued according to the table of FIG. 8, in Step S358.

Hereinafter, examples of the operations specified in the operation table of FIG. 8, will be concretely described.

Figure 21:
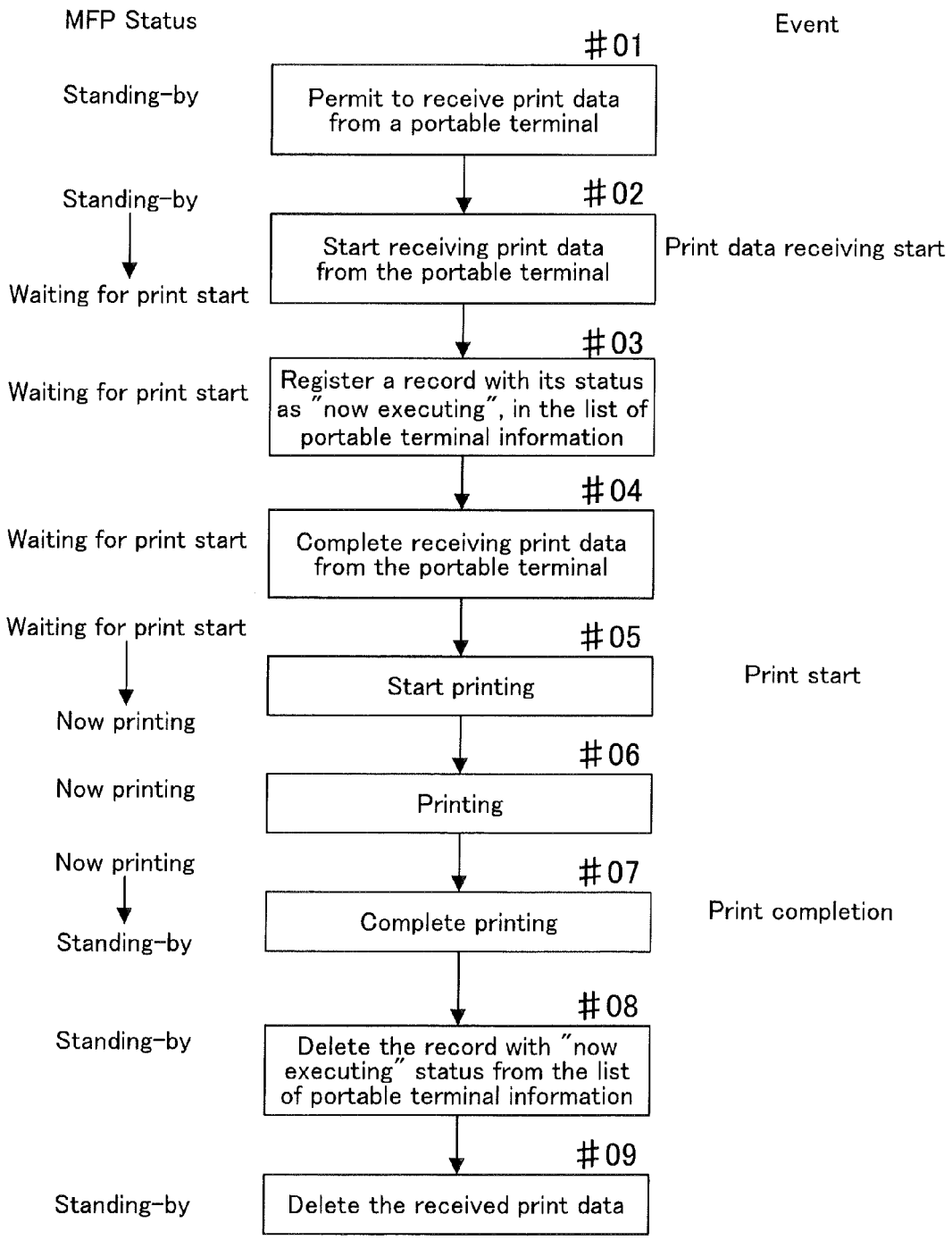
FIG. 21 is a view to explain a normal operation after receiving print data from a portable terminal until completing a print operation.

FIG. 21 is a view to explain a normal operation after receiving print data from the portable terminal 2 until completing a print operation.

As may be noted in the following Figures, the blocks provided in the center correspond to the operation performed by the image forming apparatus 1, the "MFP status" field provided in the left side is for the operations specified in the "MFP status" column of FIG. 8, and the "event" field provided in the right side is for issued events specified in the "communication status change event" column or the "MFP operation" column of FIG. 8.

The image forming apparatus 1 issues a permission to receive print data from the portable terminal 2 (#01). Meanwhile, the data in the "MFP status" column indicates "standing-by".

Then, the image forming apparatus 1 starts receiving the print data (#02), and the data in the "MFP status" column is changed from "standing-by" to "waiting for print start". Subsequently, the image forming apparatus 1 registers a record related to the portable terminal with its status as "now executing", in the list of portable terminal information (#03), and completes receiving the print data from the portable terminal 2 (#04), and then starts a print operation (#05). When the print operation is started, the data in the "MFP status" column is changed from "waiting for print start" to "now printing".

The print operation is performed until the end (#06), and when it is completed (#07), the data in the "MFP status" column is changed from "now printing" to "standing-by". After completion of the print operation, the image forming apparatus 1 deletes the record with "now executing" status, from the list of portable terminal information (#07), and also deletes the print data received in advance, from the memory 107 (#09).

Figure 22:
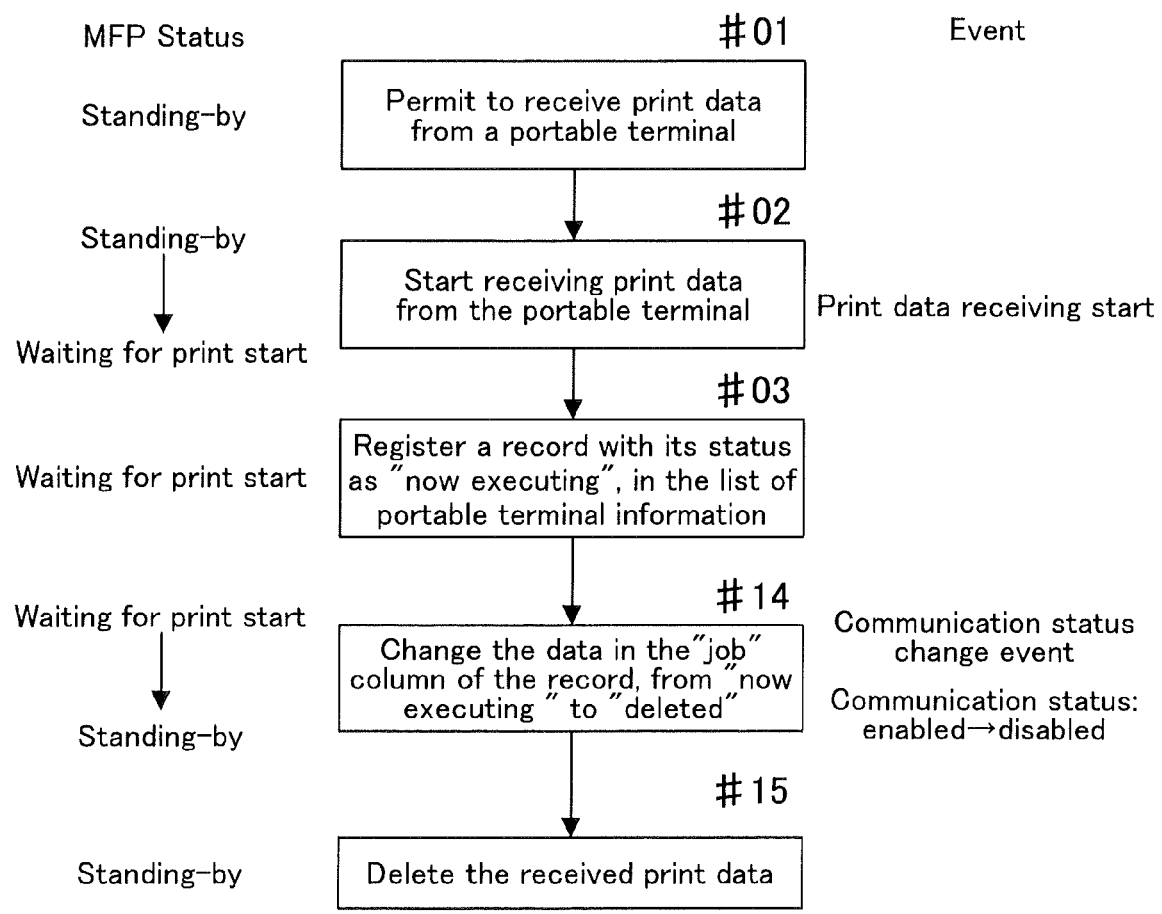
FIG. 22 is a view showing an example of an operation, in which a close-range wireless communication with a portable terminal happens to be disabled before print data is completely received from the portable terminal.

FIG. 22 is a view showing an example of an operation, in which a close-range wireless communication with the portable terminal 2 happens to be disabled before print data is completely received from the portable terminal 2. In this example, if a communication with the portable terminal 2 happens to be disabled, the print data recorded in the image forming apparatus 1 is deleted.

FIG. 22 and the following Figures share the same operations with the same operation numbers as those in FIG. 21, and explanation thereof will be omitted or simplified.

The image forming apparatus 1 starts receiving print data from the portable terminal 2 (#02), and registers a record with its status as "now executing", in the list of portable terminal information (#03). If the availability of a close-range wireless communication with the portable terminal 2 is changed from "enabled" to "disabled" before start of a print operation, a communication status change event is issued. Then, the image forming apparatus 1 changes the data in the "job" column of the record, from "now executing" to "deleted" (#14). Meanwhile, the data in the "MFP status" column is changed from "waiting for print start" to "standing-by". And the print data received in advance is deleted (#15).

As described above, in this embodiment, print data received from the portable terminal 2 is deleted, if the availability of a communication with the portable terminal 2 is changed from "enabled" to "disabled", during the period after start of receiving the print data and before start of a print operation. In other words, if a communication with the portable terminal 2 is judged as being disabled while the image forming apparatus 1 is in the normal print operational status, there is a high possibility that a user who had instructed a print job could not wait and gave up printing, or had mistakenly instructed the print job. And thus, this configuration is intended to delete the print data. Accordingly, that would prevent the print data from being leaked to a third parson and ensure security of the print data.

Figure 23:
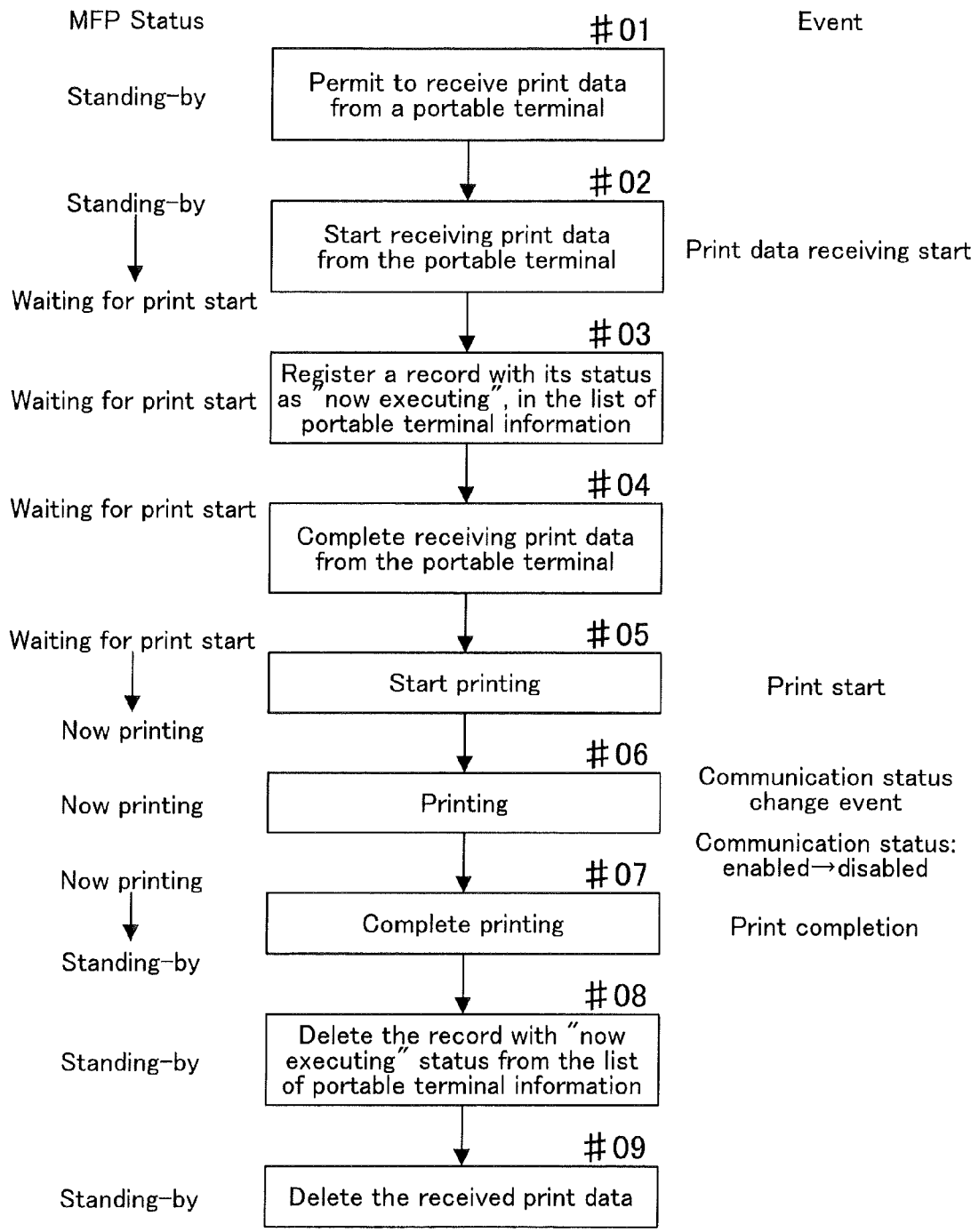
FIG. 23 is a view showing an example of an operation, in which a close-range wireless communication with a portable terminal happens to be disabled while the image forming apparatus is normally performing a print operation.

FIG. 23 is a view showing an example of an operation, in which a close-range wireless communication with the portable terminal 2 happens to be disabled while the image forming apparatus 1 is normally performing a print operation. In this example, even if a communication with the portable terminal 2 happens to be disabled, the print data recorded in the image forming apparatus 1 is kept recorded therein instead of being deleted, and the print operation is kept running.

The image forming apparatus 1 completes receiving the print data from the portable terminal 2 (#04), and starts a print operation (#05), and then performs the print operation (#06). Even if the availability of a close-range wireless communication with the portable terminal 2 is changed from "enabled" to "disabled" during the print operation, the operation of the image forming apparatus 1 is not changed, thus the print operation is kept running. In other words, even if such a trouble occurs during a normal print operation, the user would understand that his/her print job is normally being executed and would come back to pick up his/her output. And thus, this configuration is intended to keep the print data recorded therein and keep the print operation running. Accordingly, that would remove the need of retransmitting a print request by user operation and ensure user-friendliness.

After completion of the print operation, the print data is deleted (#09).

Figure 24:
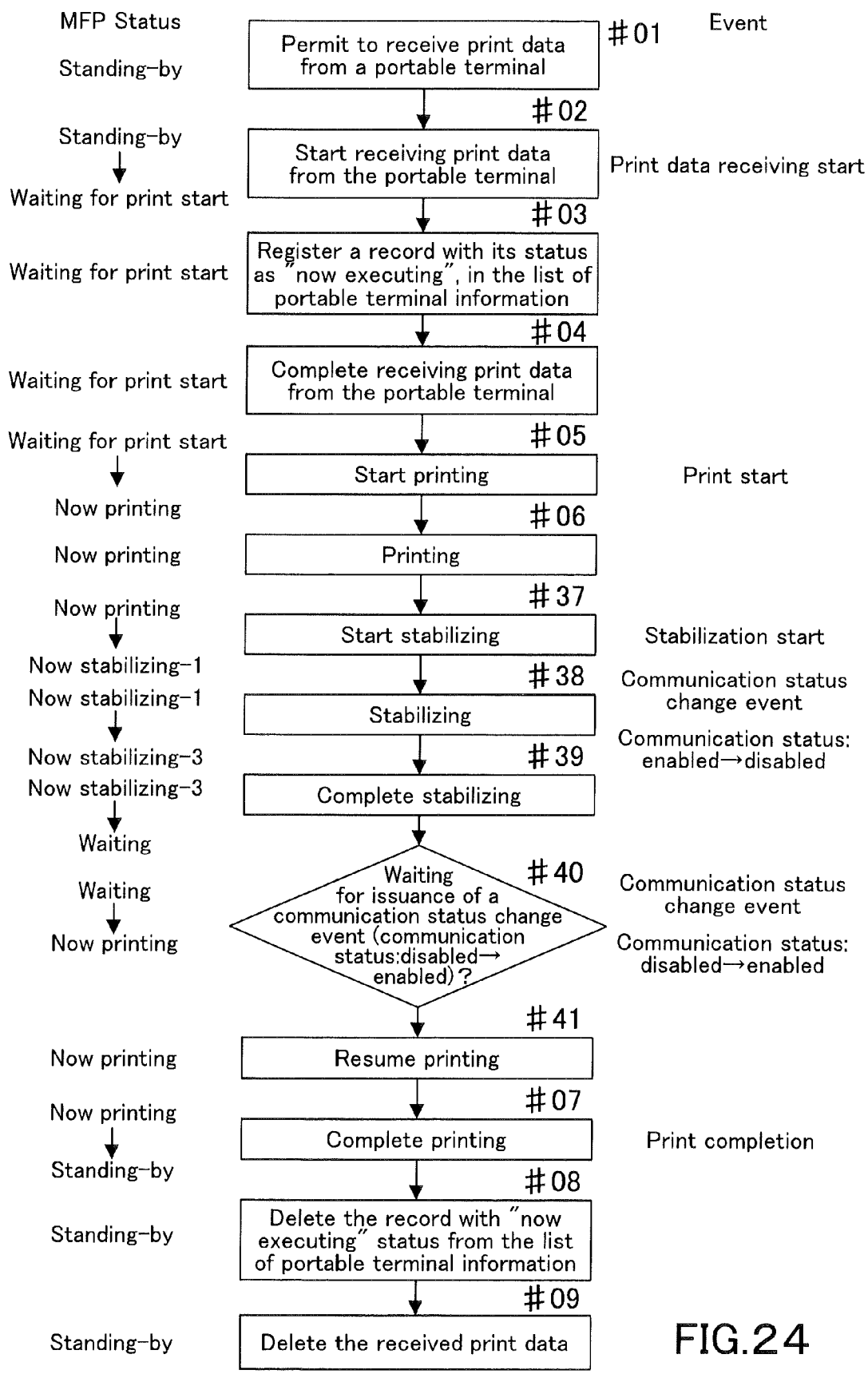
FIG. 24 is a view showing an example of an operation, in which a close-range wireless communication with a portable terminal happens to be disabled while a print operation is interrupted due to a trouble that is easy enough to restore the print operation to normal status without the need of user operation.

FIG. 24 is a view showing an example of an operation, in which a close-range wireless communication with the portable terminal 2 happens to be disabled while a print operation is interrupted due to a trouble that is easy enough to restore the print operation to normal status without the need of user operation. In this example, even if a communication with the portable terminal 2 happens to be disabled, the print data recorded in the image forming apparatus 1 is kept recorded therein instead of being deleted and a communication with the portable terminal 2 is enabled again, and then the print operation is resumed when the image forming apparatus 1 is restored to the normal operational status. Although a trouble that is easy enough to restore the print operation to normal status without the need of user operation, is represented by interruption of the print operation, which is caused by a stabilization process, the trouble is not limited thereto.

While the image forming apparatus 1 is performing the print operation (#06), a stabilization process is started (#37), which causes interruption of the print operation. And the data in the "MFP status" column is changed from "now printing" to "now stabilizing—1". When a stabilization process is performed (#38), the data in the "MFP status" column is changed from "now stabilizing—1" to "now stabilizing—3". Even if the availability of a close-range wireless communication with the portable terminal 2 is changed from "enabled" to "disabled" during the stabilizing process, the image forming apparatus 1 keeps the stabilization process running and keeps the print data recorded therein instead of deleting.

When the stabilization process is completed (#39), the image forming apparatus 1 is restored to the normal operational status, and the data in the "MFP status" column is changed from "now stabilizing—3" to "waiting". And the image forming apparatus 1 waits until a close-range wireless communication with the portable terminal 2 is enabled again (#40).

When a close-range wireless communication with the portable terminal 2 is enabled again (#40), and the data in the "MFP status" column is changed from "waiting" to "now printing". Then the print operation is resumed (#41). After completion of the print operation (#07), the print data is deleted (#09).

As described above, if a communication with the portable terminal 2 happens to be disabled while a print operation is interrupted due to a trouble that is easy enough to restore the print operation to normal status without the need of user operation, there is a possibility that the user mistakenly recognizes as if the print operation were completed. And thus, this configuration is intended to resume the print operation when the image forming apparatus 1 is restored to the normal operational status, by keeping the print data recorded therein and enabling again a communication with the portable terminal 2. Accordingly, that would ensure user-friendliness.

Figure 25:
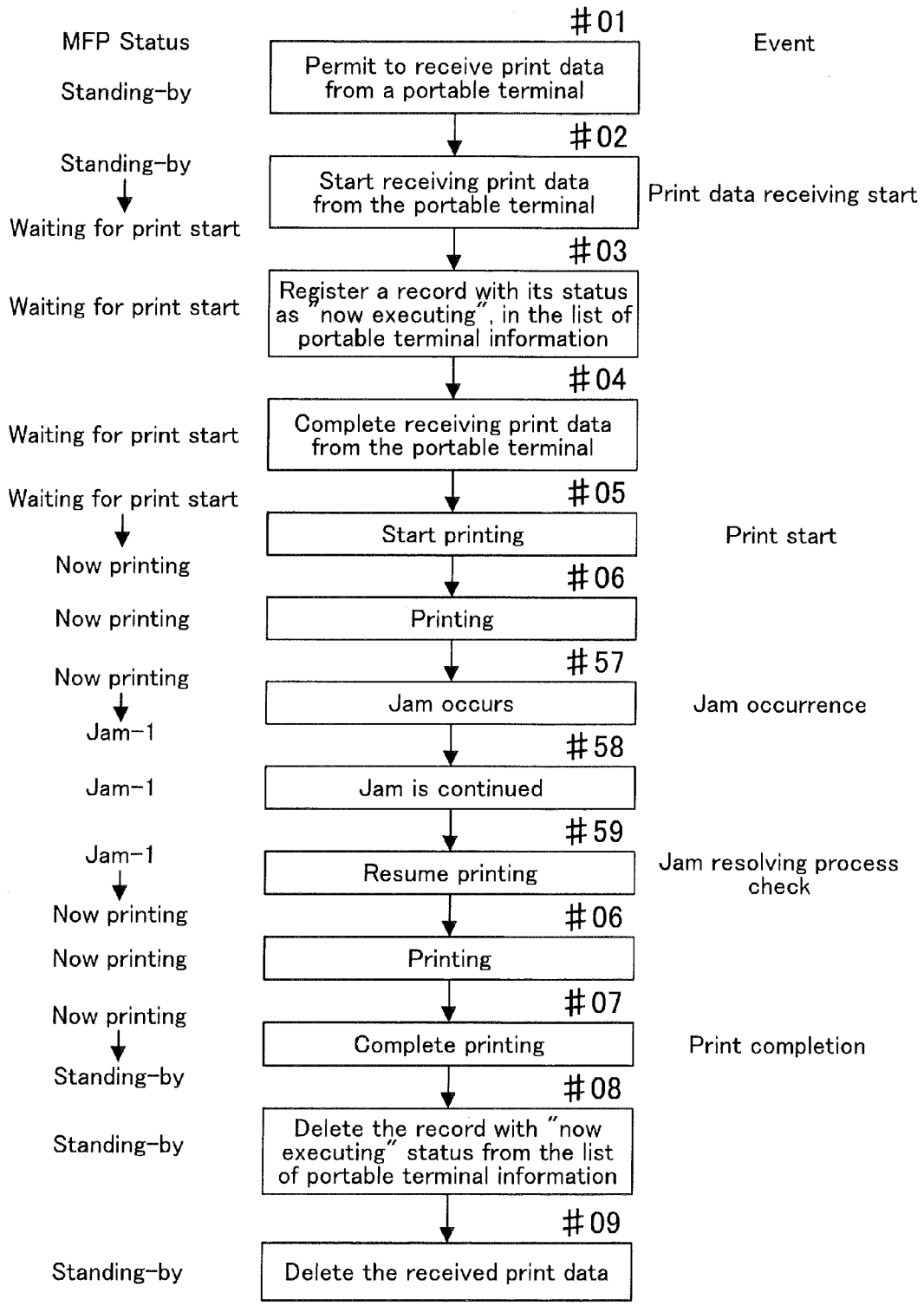
FIG. 25 is a view showing an example of an operation, in which a close-range wireless communication with a portable terminal is judged as still being enabled while a print operation is interrupted due to a trouble that is easy enough to restore the print operation to normal status by user operation.

FIG. 25 is a view showing an example of an operation, in which a close-range wireless communication with the portable terminal 2 is judged as still being enabled while a print operation is interrupted due to a trouble that is easy enough to restore the print operation to normal status by user operation. In this example, if a communication with the portable terminal 2 is still enabled, the print data recorded in the image forming apparatus 1 is kept recorded therein instead of being deleted, and the print operation is resumed when the image forming apparatus 1 is restored to the normal operational status. Although a trouble that is easy enough to restore the print operation to normal status by user operation is represented by interruption of the operation, which is caused by a jam, the trouble is not limited thereto.

While the image forming apparatus 1 is performing the print operation (#06), a jam occurs (#57), which causes interruption of the print operation. And the data in the "MFP status" column is changed from "now printing" to "jam—1". As long as a jam continues (#58), the data in the "MFP status" column is kept as "jam—1". Furthermore, a communication with the portable terminal 2 is kept enabled, and also the print data is kept recorded therein instead of being deleted.

When a jam resolving process check (jam resolving process completion) event is issued, the print operation is resumed (#59). After completion of the print operation (#07), the print data is deleted (#09).

As described above, in this embodiment, if a communication with the portable terminal 2 is judged as still being enabled while a print operation is interrupted due to a trouble that is easy enough to restore the print operation to normal status by user operation, it would appear that the user or someone in the presence of the user is trying to restore the image forming apparatus 1 to the normal operational status, and the user is regarded as being in the vicinity of the image forming apparatus 1. And thus, the print data is kept recorded therein, and the print operation is resumed when the image forming apparatus 1 is restored to the normal operational status, which would ensure user-friendliness.

Figure 26:
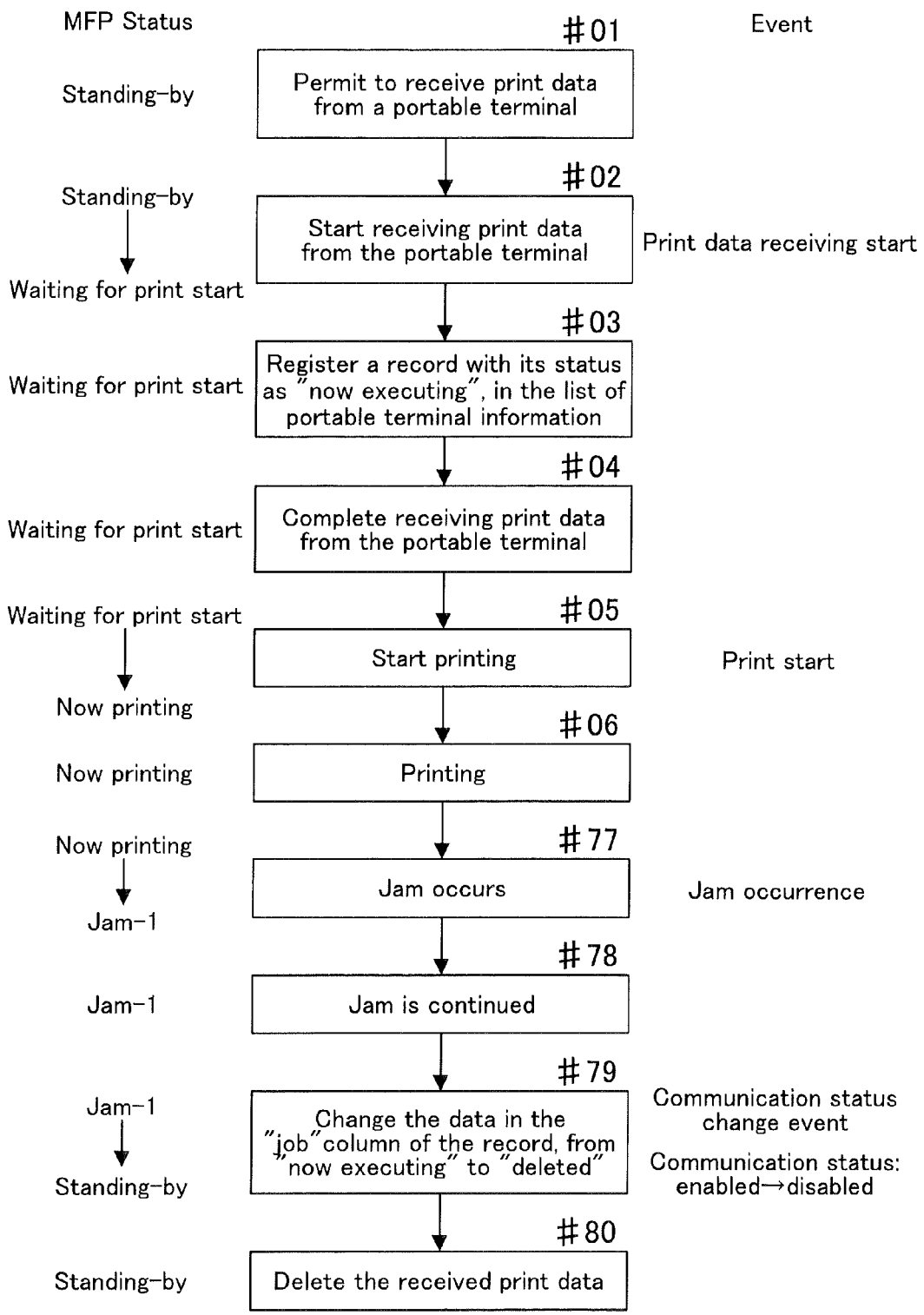
FIG. 26 is a view showing an example of an operation, in which a close-range wireless communication with a portable terminal happens to be disabled while a print operation is interrupted due to occurrence of a jam as in the case of FIG. 25.

FIG. 26 is a view showing an example of an operation, in which a close-range wireless communication with the portable terminal 2 happens to be disabled while a print operation is interrupted due to occurrence of a jam as in the case of FIG. 25. In this example, if a communication with the portable terminal 2 happens to be disabled, the print data recorded in the image forming apparatus 1 is deleted.

While a print operation is interrupted due to a jam (#78), the availability of a close-range wireless communication with the portable terminal 2 is changed from "enabled" to "disabled". Then, the data in the "job" column of the record registered in the list of portable terminal information, is changed from "now executing" to "deleted" (#79). Meanwhile, the data in the "MFP status" column is changed from "jam—1" to "standing-by". And the print data is deleted (#80).

As described above, in this embodiment, if a communication with the portable terminal 2 is judged as being disabled while a print operation is interrupted due to a trouble that is easy enough to restore the print operation to normal status by user operation, it would appear that the user has gone without performing a restoration operation. And thus, this configuration is intended to restore the operation by deleting the print data. Accordingly, that would prevent the print data from being leaked to a third person and ensure the security.

Figure 27:
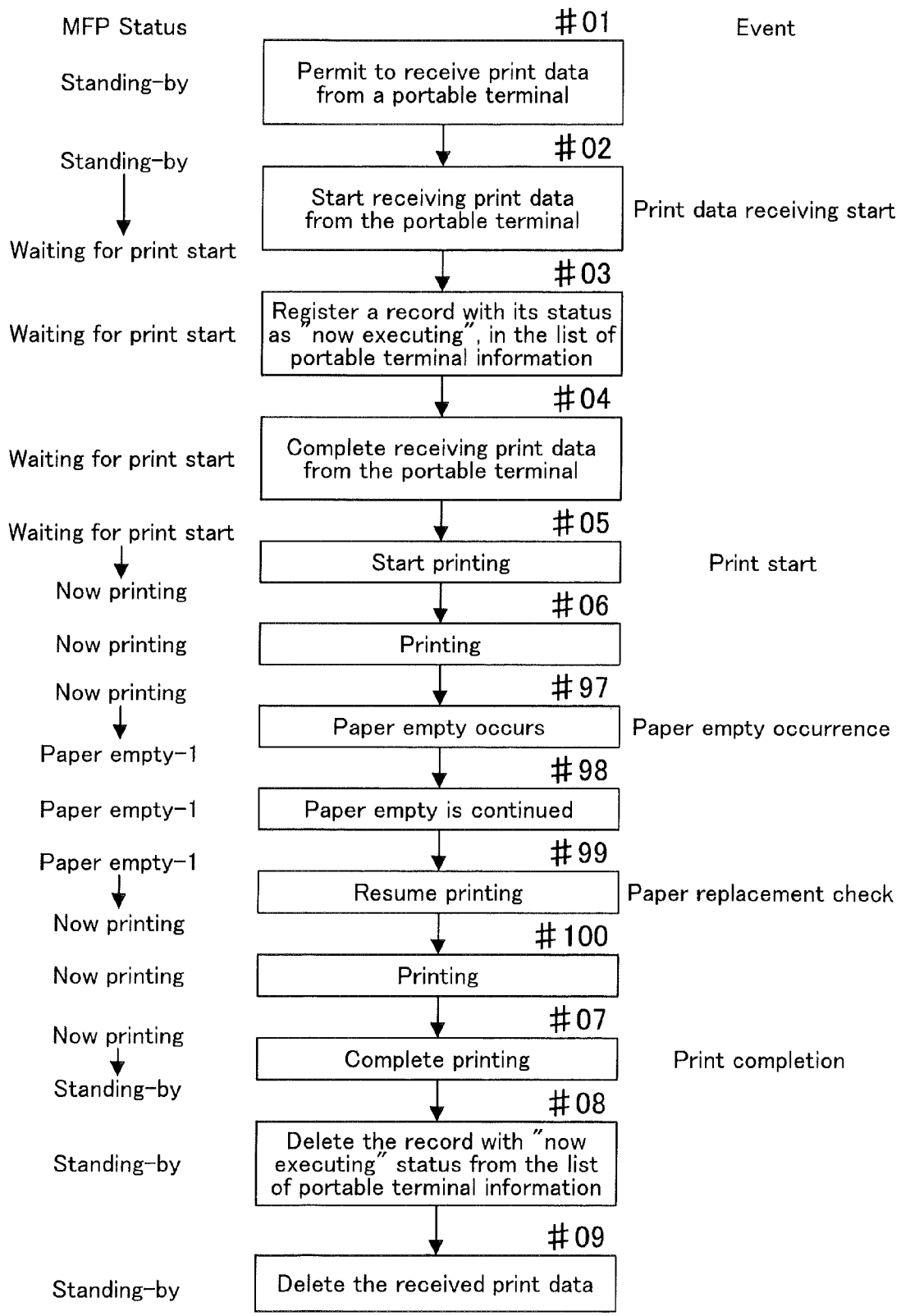
FIG. 27 is a view showing an example of an operation, in which a close-range wireless communication with a portable terminal is judged as still being enabled while a print operation is interrupted due to a trouble that is easy enough to restore the print operation to normal status by user operation such as replacement of supplies.

FIG. 27 is a view showing an example of an operation, in which a close-range wireless communication with the portable terminal 2 is judged as being still enabled while a print operation is interrupted due to a trouble that is easy enough to restore the print operation to normal status by replacement of supplies. In this example, if a communication with the portable terminal 2 is still enabled, the print data recorded in the image forming apparatus 1 is kept recorded therein instead of being deleted, and the print operation is resumed when the image forming apparatus 1 is restored to the normal operational status. Although a trouble that is easy enough to restore the print operation to normal status by replacement of supplies, is represented by interruption of the print operation, which is caused by a paper empty, the trouble is not limited thereto. Alternatively, the trouble may be a different one that needs to be resolved by replacement of other supplies, for example a toner empty.

While the image forming apparatus 1 is performing the print operation (#06), a paper empty occurs (#97), which causes interruption of the print operation. And the data in the "MFP status" column is changed from "now printing" to "paper empty—1". As long as a paper empty continues (#98), the data in the "MFP status" column is kept as "paper empty—1". Furthermore, a communication with the portable terminal 2 is kept enabled, and also the print data is kept recorded therein instead of being deleted.

When a paper replacement check (paper replacement completion) event is issued, the print operation is resumed (#99). After completion of the print operation (#07), the print data is deleted (#09).

As described above, in this embodiment, if a communication with the portable terminal 2 is judged as being still enabled while a print operation is interrupted due to a trouble that is easy enough to restore the print operation to normal status by replacement of supplies, it would appear that the user or someone in the presence of the user is trying to replace supplies, and the user is regarded as being in the vicinity of the image forming apparatus 1. And thus, the print data is kept recorded therein, and the print operation is resumed when the image forming apparatus 1 is restored to the normal operational status, which would ensure user-friendliness.

Figure 28:
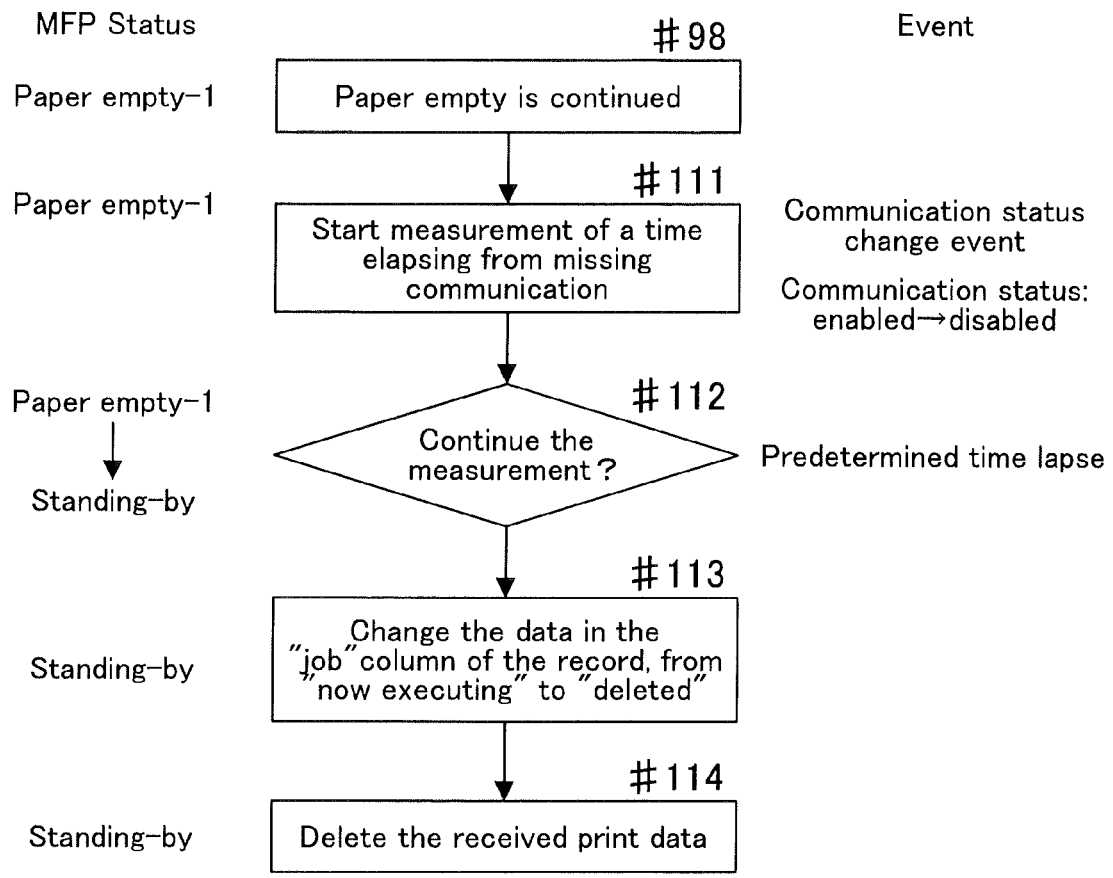
FIG. 28 is a view showing an example of an operation, in which a close-range wireless communication with the portable terminal 2 happens to be disabled while a print operation is interrupted due to occurrence of a paper empty as in the case of FIG. 27.

FIG. 28 is a view showing an example of an operation, in which a close-range wireless communication with the portable terminal 2 happens to be disabled while a print operation is interrupted due to occurrence of a paper empty as in the case of FIG. 27. In this example, even if a communication with the portable terminal 2 happens to be disabled, the print data recorded in the image forming apparatus 1 is not immediately deleted and the image forming apparatus 1 waits until a predetermined time elapses, and if a communication with the portable terminal 2 is not enabled again until then, the print data is deleted after a lapse of a predetermined time.

While a print operation is interrupted due to a paper empty (#98), the availability of a close-range wireless communication with the portable terminal 2 is changed from "enabled" to "disabled". Then, measurement of a duration of missing communication (time elapsing from missing communication) is started (#111).

When a duration of missing communication reaches a predetermined time (#112), the data in the "MFP status" column is changed from "paper empty—1" to "standing-by". Meanwhile, the data in the "job" column of the record registered in the list of portable terminal information, is changed from "now executing" to "deleted" (#113). And the print data is deleted (#114).

As described above, in this embodiment, if a communication with the portable terminal 2 is judged as being disabled while a print operation is interrupted due to a trouble that is easy enough to restore the print operation to normal status by replacement of supplies, it would appear that the user is temporarily away to find supplies, thus the image forming apparatus 1 waits until a duration of missing communication reaches a predetermined time. And when it reaches a predetermined time, the print data is deleted. Accordingly, that would ensure user-friendliness and also eliminate the security risk caused by leaving the print data unnecessarily recorded therein for a long time.

Figure 29:
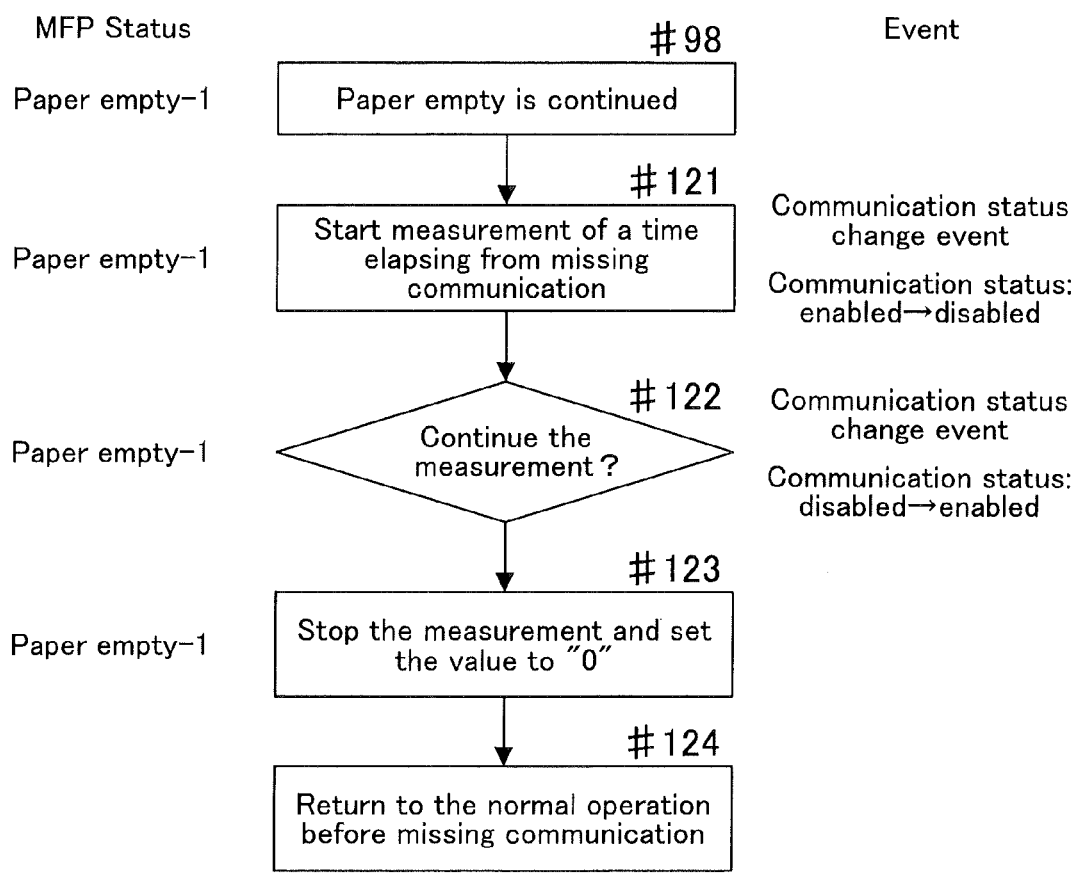
FIG. 29 is a view showing an example of an operation, in which a close-range wireless communication with the portable terminal 2 is enabled again within a predetermined time, after the communication happens to be disabled while a print operation is interrupted due to occurrence of a paper empty as in the case of FIG. 28.

FIG. 29 is a view showing an example of an operation, in which a close-range wireless communication with the portable terminal 2 is enabled again within a predetermined time, after the communication happens to be disabled while a print operation is interrupted due to occurrence of a paper empty as in the case of FIG. 28. In this example, the duration of missing communication is reset.

While a print operation is interrupted due to a paper empty (#98), the availability of a close-range wireless communication with the portable terminal 2 is changed from "enabled" to "disabled". Then, measurement of a duration of missing communication (time elapsing from missing communication) is started (#121).

While a duration of missing communication is being measured (#122), the availability of a close-range wireless communication with the portable terminal 2 is changed from "disabled" to "enabled". Then, measurement of a duration of missing communication is stopped and the data in the "time elapsing from missing communication" column of the record registered in the list of portable terminal information, is set to "0" (#123).

After that, the operation returns to a paper empty resolving process that is the normal operation (#124).

As described above, in this embodiment, if a communication with the portable terminal 2 is judged as being enabled again, a duration of missing communication is reset. And thus, for example, even if the user who has been temporarily away from the image forming apparatus 1 to find supplies, temporarily comes back with supplies and then leaves again, the print data is prevented from being immediately deleted, which would ensure user-friendliness.

Figure 30:
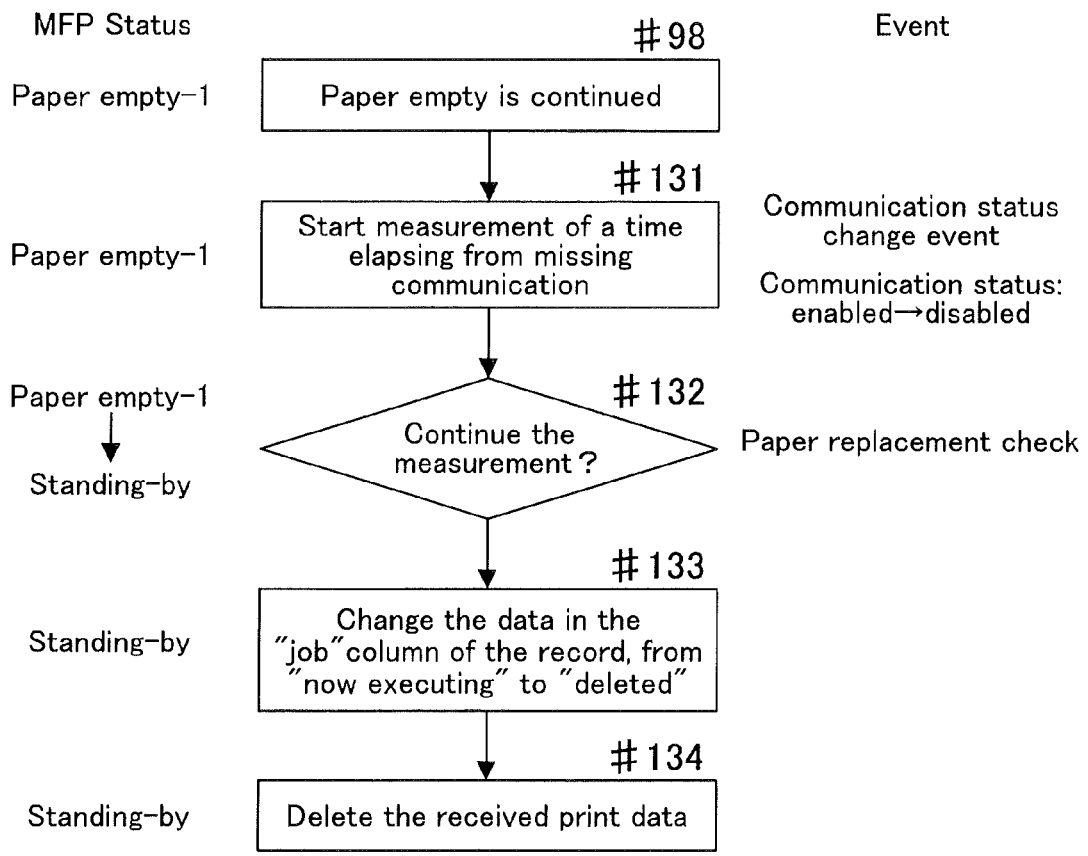
FIG. 30 is a view showing an example of an operation, in which a paper empty is resolved before a lapse of a predetermined time, after a close-range wireless communication with the portable terminal 2 happens to be disabled while a print operation is interrupted due to occurrence of a paper empty as in the case of FIG. 29.

FIG. 30 is a view showing an example of an operation, in which a paper empty is resolved before a lapse of a predetermined time, after a close-range wireless communication with the portable terminal 2 happens to be disabled while a print operation is interrupted due to occurrence of a paper empty as in the case of FIG. 29.

While a print operation is interrupted due to a paper empty (#98), the availability of a close-range wireless communication with the portable terminal 2 is changed from "enabled" to "disabled". Then, measurement of a duration of missing communication (time elapsing from missing communication) is started (#131).

While a duration of missing communication is being measured (#132), a paper replacement check (paper replacement completion) event is issued. Then, the data in the "job" column of the record registered in the list of portable terminal information, is changed from "now executing" to "deleted" (#133). And the print data is deleted (#134).

As described above, in this embodiment, if the image forming apparatus 1 is restored to the normal operational status by replacement of supplies, after a communication with the portable terminal 2 happens to be disabled while a print operation is interrupted due to a trouble that is easy enough to restore the print operation to normal status by replacement of supplies, there is a high possibility that someone other than the user performed a restoration operation. And thus, this configuration is intended to delete the print data. Accordingly, that would ensure security of the print data.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
    a close-range wireless communicator that is capable of performing a close-range wireless communication with a user's using portable terminal;
    a memory that records in itself, print data that is transmitted by the portable terminal and received by the close-range wireless communicator or print data that is obtained from a storage location according to storage information of the print data, which is transmitted by the portable terminal;
    a printer that prints out the print data recorded therein;
    a communication status judger that judges whether or not a communication with the portable terminal is enabled by the close-range wireless communicator, until the printer completes printing out the print data; and
    a controller that deletes the print data from the memory or keeps the print data recorded in the memory, based on a judgment result drawn by the communication status judger and a print operation status of printing control operations within the image forming apparatus itself before a print operation of the print data is completed.

2. The image forming apparatus recited in claim 1, wherein the controller deletes the print data, if it is judged that a communication with the portable terminal is disabled after the close-range wireless communicator starts receiving the print data and before the printer starts printing out the print data, even though a print operation can be performed normally.

3. The image forming apparatus recited in claim 1, wherein the controller keeps the print data recorded therein and keeps a print operation running, if it is judged that a communication with the portable terminal is disabled while the print operation is being performed normally.

4. The image forming apparatus recited in claim 1, wherein the controller keeps the print data recorded therein, if it is judged that a communication with the portable terminal is disabled while a print operation is interrupted due to a trouble that is easy enough to restore the print operation to normal status without the need of user operation, and after that, the controller resumes the print operation, if a communication with the portable terminal is enabled again and the normal operational status is regained.

5. The image forming apparatus recited in claim 1, wherein the controller keeps the print data recorded therein, if it is judged that a communication with the portable terminal is enabled while a print operation is interrupted due to a trouble that is easy enough to restore the print operation to normal status by user operation, and after that, the controller resumes the print operation after the normal operational status is regained.

6. The image forming apparatus recited in claim 1, wherein the controller deletes the print data, if it is judged that a communication with the portable terminal is disabled while a print operation is interrupted due to a trouble that is easy enough to restore the print operation to normal status by user operation.

7. The image forming apparatus recited in claim 1, wherein the controller keeps the print data recorded therein, if it is judged that a communication with the portable terminal is enabled while a print operation is interrupted due to a trouble that is easy enough to restore the print operation to normal status by replacement of supplies, and after that, the controller resumes the print operation after the normal operational status is regained.

8. The image forming apparatus recited in claim 1, wherein the controller deletes the print data, if a duration of missing communication reaches a predetermined time after it is judged that a communication with the portable terminal is disabled while a print operation is interrupted due to a trouble that is easy enough to restore the print operation to normal status by replacement of supplies.

9. The image forming apparatus recited in claim 8, wherein the duration of missing communication is reset, if it is judged that a communication with the portable terminal is enabled.

10. The image forming apparatus recited in claim 8, wherein the controller deletes the print data, if the normal operational status is regained while the communication is disabled.

11. The image forming apparatus recited in claim 2, further comprising:
    a notifier that notifies the portable terminal of deletion of the print data if it is judged that a communication with the portable terminal is enabled after the controller deletes the print data.

12. The image forming apparatus recited in claim 1, wherein the close-range wireless communicator is a communicator that employs the Bluetooth.

13. A print data processing method of an image forming apparatus, comprising:
    recording in a memory, print data that is transmitted by a user's using portable terminal and received by a close-range wireless communicator, or print data that is obtained from a storage location according to storage information of the print data, which is transmitted by the portable terminal;
    printing out the print data recorded therein, by a printer;
    judging whether or not a communication with the portable terminal is enabled by the close-range wireless communicator, until the print data is completely printed out in the prior step; and
    deleting the print data from the memory or keeping the print data recorded in the memory, based on a judgment result drawn in the prior step and a print operation status of printing control operations within the image forming apparatus before a print operation of the print data is completed.

14. A non-transitory computer readable recording medium having a print data processing program recorded therein to make a computer of an image forming apparatus execute:
    recording in a memory, print data that is transmitted by a user's using portable terminal and received by a close-range wireless communicator, or print data that is obtained from a storage location according to storage information of the print data, which is transmitted by the portable terminal;
    printing out the print data recorded therein, by a printer;
    judging whether or not a communication with the portable terminal is enabled by the close-range wireless communicator, until the print data is completely printed out in the prior step; and
    deleting the print data from the memory or keeping the print data recorded in the memory, based on a judgment result drawn in the prior step and a print operation status of printing control operations within the image forming apparatus before a print operation of the print data is completed.

* * * * *